US008619177B2

(12) United States Patent
Perwass et al.

(10) Patent No.: US 8,619,177 B2
(45) Date of Patent: Dec. 31, 2013

(54) DIGITAL IMAGING SYSTEM, PLENOPTIC OPTICAL DEVICE AND IMAGE DATA PROCESSING METHOD

(75) Inventors: Ulrich Perwass, Bergisch-Gladbach (DE); Christian Perwass, Kiel (DE)

(73) Assignee: Raytrix GmbH, Kiel (DE)

(*) Notice: Subject to any disclaimer, the term of this patent is extended or adjusted under 35 U.S.C. 154(b) by 0 days.

(21) Appl. No.: 13/264,173

(22) PCT Filed: Dec. 4, 2009

(86) PCT No.: PCT/EP2009/008682
§ 371 (c)(1),
(2), (4) Date: Nov. 16, 2011

(87) PCT Pub. No.: WO2010/121637
PCT Pub. Date: Oct. 28, 2010

(65) Prior Publication Data
US 2012/0050562 A1 Mar. 1, 2012

(30) Foreign Application Priority Data
Apr. 22, 2009 (EP) .................................. 09005628

(51) Int. Cl.
H04N 5/225 (2006.01)
H04N 5/228 (2006.01)
H04N 5/262 (2006.01)

(52) U.S. Cl.
USPC ......... 348/340; 348/222.1; 348/239; 348/335

(58) Field of Classification Search
USPC .............. 348/222.1, 262, 332, 335, 340, 343, 348/355, 360; 359/619; 396/332, 334
See application file for complete search history.

(56) References Cited

U.S. PATENT DOCUMENTS 7,936,392 B2 5/2011 Ng et al.
7,949,252 B1* 5/2011 Georgiev ...................... 396/334
(Continued)

FOREIGN PATENT DOCUMENTS

CN 100556076 C 10/2009
WO 2006039486 A2 4/2006
WO 2007092581 A2 8/2007

OTHER PUBLICATIONS

Ng, "Digital light field photography", A dissertation sumbitted to the department of computer science and the committee on graduate studies of stanford university (Jul. 2006), http://www.lytro.com/renng-thesis.pdf.*

(Continued)

Primary Examiner — Nhan T Tran
Assistant Examiner — Xi Wang
(74) Attorney, Agent, or Firm — Caesar, Rivise, Bernstein, Cohen & Pokotilow, Ltd.

(57) ABSTRACT

A digital imaging system being configured for synthesizing an image of a plenoptic optical device, comprises a photosensor array comprising a plurality of photosensors arranged in a predetermined image plane, and a microlens array comprising a plurality of microlenses arranged for directing light from an object to the photosensor array, wherein the photosensor array and the microlens array are arranged with a predetermined distance, the microlenses have different focal lengths varying over the microlens array, and the image plane of the photosensor array is arranged such that the distance between the photosensor array and the microlens array does not equal the microlenses' focal lengths. Furthermore, a plenoptic optical device including the digital imaging system and a method for processing image data collected with the digital imaging system are described.

16 Claims, 16 Drawing Sheets

(56) References Cited

U.S. PATENT DOCUMENTS

| | | |
|---|---|---|
| 8,289,440 B2 * | 10/2012 | Knight et al. .................. 348/349 |
| 2003/0020883 A1 * | 1/2003 | Hara ............................... 353/31 |
| 2006/0176566 A1 * | 8/2006 | Boettiger et al. ............. 359/619 |
| 2007/0046862 A1 * | 3/2007 | Umebayashi et al. .......... 349/95 |
| 2007/0252074 A1 * | 11/2007 | Ng et al. ..................... 250/208.1 |
| 2008/0131019 A1 | 6/2008 | Ng |
| 2009/0041448 A1 | 2/2009 | Georgiev et al. |
| 2009/0128669 A1 | 5/2009 | Ng et al. |
| 2009/0200623 A1 * | 8/2009 | Qian et al. .................... 257/432 |
| 2010/0026852 A1 * | 2/2010 | Ng et al. ....................... 348/239 |
| 2011/0169994 A1 * | 7/2011 | DiFrancesco et al. ........ 348/340 |

OTHER PUBLICATIONS

Lumsdaine et al., "Full Resolution Lightfield Rendering", Adobe Technical Report, pp. 1-12 (2008), http://www.tgeorgiev.net/FullResolution.pdf.

Ng et al., "Light Field Photography with a Hand-held Plenoptic Camera", Stanford Tech Report http://graphics.stanford.edu/papers/lfcamera/lfcamera-150dpi.pdf (2007).

International Search Report for PCT/EP2009/008682 dated Feb. 19, 2010.

* cited by examiner

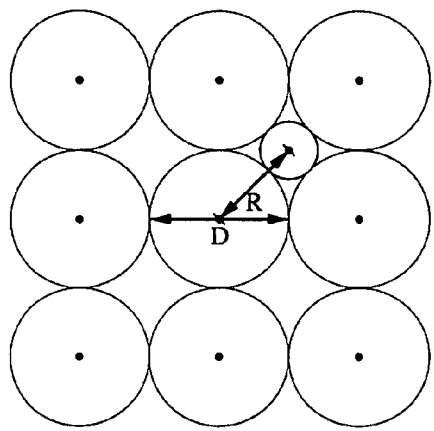
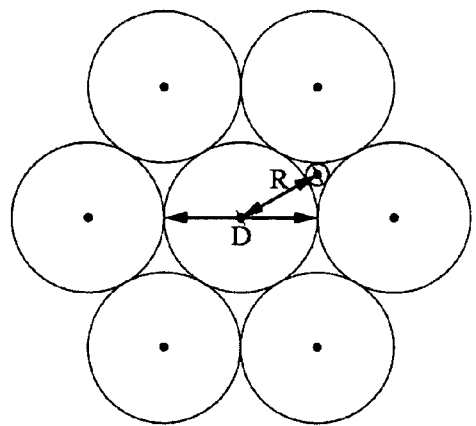
FIG. 7    FIG. 8
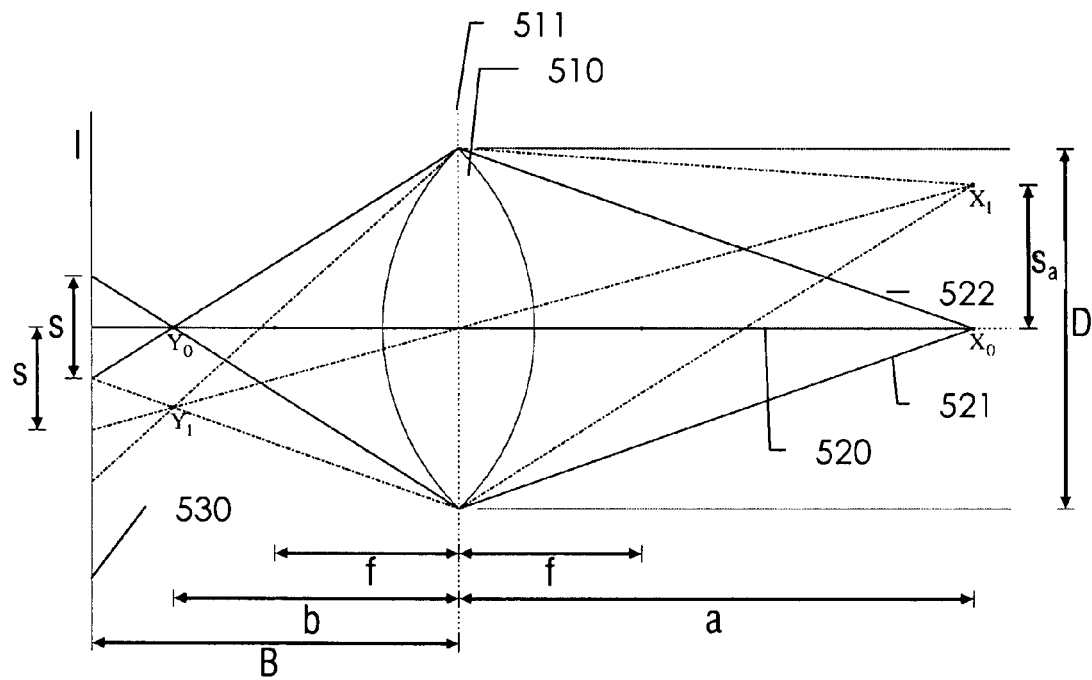
FIG. 9

1110

1120

1130

1140

1210

1220

1230

1240

DIGITAL IMAGING SYSTEM, PLENOPTIC OPTICAL DEVICE AND IMAGE DATA PROCESSING METHOD

FIELD OF THE INVENTION

The present invention relates to a digital imaging system being configured for synthesizing an image of a plenoptic optical device (e.g. plenoptic camera). Furthermore, the present invention relates to an optical device, like e.g. a camera device, a scanning device, or a microscope device including the digital imaging system. Furthermore, the present invention relates to a method for processing image data collected with the digital imaging system. In particular, this invention relates to a system employing a camera for Radiance Photography (plenoptic camera) and a method to use it to produce and display pictures with varying depths of sharpness.

TECHNICAL BACKGROUND

A plenoptic camera (light field camera) is a camera which is capable of sampling a light distribution and light directions in a light field. On the basis of this information, images can be collected with increased focal depth and/or images can be digitally refocused. In a standard plenoptic camera, an array of microlenses is placed in front of the image plane as, for example, a photographic plate or a photosensor array. This construction not only records the light focused onto the particular plane but records the field of light rays (light field) emanating from the lens. The final image can be generated from the recorded raw data using a computational algorithm, which is why the plenoptic camera is regarded as belonging to the field of computational photography. There exist algorithms to generate images from the light field at different (virtual) focal planes and to estimate the scene depth at multiple positions.

The two plenoptic camera designs published previously are:
1. The standard plenoptic camera first described by Lippmann in 1908, which is also described in WO 2007/092581 A2 and by Ren Ng et al. in "Stanford Tech Report" CTSR 2005-02. The effective resolution of this plenoptic camera is the same as the number of microlenses used.
2. The "focused plenoptic camera" first described in 2008 in a technical report by Lumsdaine and Georgiev (A. Lumsdaine and T. Georgiev. Full resolution lightfield rendering. Technical report, Adobe Systems, January 2008) and US 2009/0041448 A1. The design described in these publications achieves a higher effective resolution. However, no theory has been presented, which allows for an analytic calculation of the achievable effective resolution of a plenoptic camera. Furthermore, the conventional image rendering algorithm works by transforming the image to the frequency domain.

A modified plenoptic camera and associated algorithms are described in WO 2006/039486 A2. As with the standard techniques, this plenoptic camera comprises a main lens, a microlens array and a photosensor array having a finer pitch than the microlens array. The microlens array being arranged in the focal plane of the main lens may comprise microlenses with different sizes being selected such that light through one of the microlenses does not overlap light through other of the microlenses. Although a locally varying angular resolution can be obtained with the different microlenses, the focal points of all microlenses share a common plane (plane of photosensor array), i.e. all microlenses of the conventional plenoptic camera have the same focal length for imaging a virtual image at an infinite distance. Thus, the imaging properties of the plenoptic camera described in WO 2006/039486 are essentially identical with the properties of the standard plenoptic cameras.

All conventional plenoptic cameras suffer from the following disadvantage. While the focal depth can be increased with the standard setup, any improvement of the effective resolution of the plenoptic camera is limited by the number of microlenses used.

OBJECTIVE OF THE INVENTION

The objective of the present invention is to provide an improved digital imaging system for synthesizing an image of a plenoptic optical device, which digital imaging system is capable of avoiding disadvantages of conventional plenoptic imaging techniques. Furthermore, the objective of the present invention is to provide an improved optical device including the digital imaging system. Furthermore, the objective of the present invention is to provide an improved method for processing image data collected with the digital imaging system.

SUMMARY OF THE INVENTION

These objectives are solved with a digital imaging system, an optical device and a method comprising the features of the independent claims. Preferred embodiments and applications of the invention are defined in the dependent claims.

According to a first aspect of the invention, the above objective is solved by a digital imaging system being configured for synthesizing an image of a plenoptic optical device. The digital imaging system comprises a photosensor array having a plurality of photosensors arranged in a predetermined image plane and a microlens array (first microlens array, main microlens array) having a plurality of microlenses arranged for directing light from an object to the photosensor array, the microlens array being arranged at a predetermined perpendicular distance relative to the photosensor array. Thus, the digital imaging system comprises a combination of the photosensor array and the microlens array. According to the invention, the microlenses have at least two different focal lengths varying over the microlens array and the image plane of the photosensor array is arranged such that the distance between the image plane of the photosensor array and the microlens array does not equal the focal length of any of the microlenses. In other words, the microlens array is made of a plurality of microlenses each of which having a focal length selected from a plurality of different focal lengths. The microlens array comprises groups of microlenses having a common focal length, wherein microlenses of different groups have different focal lengths. Furthermore, according to the invention, the image plane of the photosensor array is arranged such that the distance between the image plane and the microlens array does not equal the focal length of any of the microlenses.

With the above combination of features, the following technical effects are obtained with the inventive digital imaging system. Firstly, due to the deviation of the focal length of any of the microlenses from the image plane—microlens distance, a virtual image at a finite distance from the microlenses is imaged onto the image plane, contrary to the imaging of a virtual image at an infinite distance with the conventional plenoptic camera. The microlenses are used for imaging with a finite focal depth. This limitation is compensated by the provision of the microlenses with different focal lengths, which allow covering a large focal depth range. Additionally and as shown by the inventor for the first time, imaging of the virtual image at the finite distance provides an improved resolution compared with the conventional camera.

According to a second aspect of the invention, the above objective is solved by a plenoptic optical device, comprising a main lens optic and the inventive digital imaging system according to the above first aspect of the invention. Preferably, the microlens array of the digital imaging system is arranged in a line of focus of the main lens optic to direct light from an object via main lens optic to the photosensor array, and for a set of light rays passing through a particular portion of the line of focus of the main lens optic, a plurality of the photosensors are arranged to sense different ones of the set of light rays that concurrently arrive at the particular portion of the line of focus at different angels of incidence. According to particularly preferred applications of the invention, the plenoptic optical device comprises a camera device (plenoptic camera), a scanning device or a microscope device. Depending on the application of the invention, the microlens array of the digital imaging system can be a one- or two-dimensional array (line array or matrix array) of microlenses. Due to the provision of a plurality of microlenses with different focal lengths, the plenoptic camera including the inventive digital imaging system is called multiple focus plenoptic camera (MFPC).

According to a third aspect of the invention, the above objective is solved by a method for processing image data collected with the digital imaging system according to the above first aspect. The method comprises the steps of providing raw image data collected with the photosensor array and providing a predetermined virtual image surface including virtual image points, wherein for each virtual image point, a group of microlenses having a maximum effective resolution ratio for imaging the virtual image point on the photosensor array is selected, the virtual image point is projected on the microlens array plane, micro images of the selected group of microlenses contributing to the intensity value of the virtual image point are detected, raw image points are selected the raw image data of which contributing to the intensity value of the virtual image point, and an averaged raw image intensity of the raw image data at the raw image points is detected. Finally, the digital image to be obtained is provided by the averaged raw image intensities for each virtual image point.

In particular, the following differences as compared to the plenoptic camera setups by Yi-Ren Ng and Todor Georgiev are notable. The inventors have shown that by varying the focal lengths of the microlenses over the array, the overall effective resolution can be increased at the cost of parallax range as compared to a microlens array with common focal length. The described method allows for the design of plenoptic cameras to specific tasks or application areas. The inventive rendering method allows for the reconstruction of an arbitrary virtual focal surface and lends itself particularly well for an implementation of highly parallel processing.

In contrast to the conventional plenoptic camera wherein in particular the distance of the microlenses from the image plane equals the microlenses' focal length and the maximal resolution of the computed images equals the number of microlenses in the array, the inventive digital imaging system provides the following advantages.

While the digital imaging system and correspondingly the multiple focus plenoptic camera of the present invention have in general a lower angular resolution than the standard plenoptic camera, the MFPC allows for resultant images with a much higher spatial resolution while retaining the computational possibilities of the standard plenoptic camera. For example, from the raw data generated by the MFPC resultant images at different foci can be generated and the scene depth can be estimated for a plurality of image points. For example, in one implementation of the MFPC an up to 70 times higher resolution could be achieved as compared to a standard plenoptic camera, while realizing an approx. 6 times larger field of depth as a standard camera without microlens array.

The much larger effective resolution of the present invention as compared to the standard plenoptic camera makes the MFPC applicable in many fields as, for example, photography, automated industrial inspection, 3D photography, 3D video and face recognition.

According to a preferred embodiment of the digital imaging system the focal length of each of the microlenses is selected from two or three different focal lengths. The inventors have found that with two or three different focal lengths an essential improvement of the focal depth can be obtained, while the angular resolution is still well-adapted for standard camera, scanner or microscopy applications. Alternatively, the focal length of each of the microlenses can be selected from more than three different focal lengths. Advantageously, the digital imaging system can be optimized in dependency on particular operation conditions, e.g. for obtaining a predetermined extension of the focal depth range.

According to a further preferred embodiment of the digital imaging system, the focal length of each of the microlenses differs from the focal length of each of the nearest neighbour microlenses thereof. Advantageously, this embodiment results in a homogeneous distribution of the angular resolution over the image.

According to a particularly preferred embodiment of the digital imaging system, the microlenses can be adjusted such that a continuous focal depth range is obtained. Firstly, the microlenses are selected such that each of the microlenses provides an effective resolution ratio depending on the focal length of the respective microlens and a depth distance from the microlens array, and, secondly, the focal lengths of the microlenses are selected such that the effective resolution ratios have complementary maxima in adjacent ranges of depth distances. This adjustment (planning) of the microlenses is based on the description of the optical properties of the plenoptic camera as outlined below, which has been proposed by the inventors for the first time.

Further improvements of the digital imaging system can be obtained if the microlenses are arranged such that groups of microlenses with equal focal length within the array of microlenses of varying focal lengths provide a regular grid. Preferably, the microlenses are arranged such that microlenses with equal focal length provide a orthogonal or hexagonal grid which have advantages in terms of a geometrically dense arrangement of the lenses.

According to a further preferred embodiment of the digital imaging system all microlenses having a common focal length have the same lens diameter. Particularly preferred is an embodiment wherein all microlenses of the microlens array have the same diameter. With these embodiments, the formation of an image with image parameters, e.g resolution or contrast, being homogeneous over the 2D image is improved.

Typically, the microlens array is fixedly attached to the photosensor array so that the above predetermined perpendicular distance of the microlens array relative to the photosensor array is set. Alternatively, according to another embodiment of the digital imaging system, the distance between the photosensor array and the microlens array can be adjustable by a control arrangement of the digital imaging system. The control arrangement which can be provided as a part of e.g. the camera, scanner or microscope comprises a variable or fixed connection of the photosensor array and the microlens array.

Another modification of the inventive digital imaging system is characterized by at least one supplementary microlens array, e.g. a second microlens array, comprising a plurality of microlenses arranged for directing light from an object to the first microlens array. With this embodiment, the functionality of the plenoptic camera can be extended.

According to a further preferred embodiment of the invention, the digital imaging system is provided with a processor in a computer set-up programmable to provide image data characterizing a synthesized image as a function of the light sensed at different photosensors of the photosensor array, the position of the photosensors relative to the microlens array and an angle of incidence of the sensed light.

BRIEF DESCRIPTION OF THE DRAWINGS

Further features and advantages of the invention are described in the following with reference to the attached drawings, which show in:

FIGS. 5 to 10: schematic illustrations of theoretical methodology on which the invention is based;

PREFERRED EMBODIMENTS OF THE INVENTION

Preferred embodiments of the invention are described in the following with reference to a digital imaging system and a plenoptic camera provided with the digital imaging system. It is emphasized that the implementation of the invention is not restricted to the illustrated examples, but rather possible with other plenoptic optical apparatuses, like optical scanning devices or microscopes. In the case of an optical scanning device, the photosensor array, typically a line array, is replaced by the inventive digital imaging device, in particular by the combination of a photosensor array and a microlens array. In this case, a main lens, which will be mentioned in the following with reference to the plenoptic camera is provided by scanner optics (cylindrical scanner lens). The microscope application includes replacing the photosensor array of a microscope by the inventive digital imaging device. In this case, the virtual image generated by the main lens in the plenoptic camera is generated by the microscope optics.

The structure of the optical apparatuses is described in the following only as far as the inventive features are concerned. Further optical or structural features of optical apparatuses, like e.g. cameras, scanning devices or microscopes, are not described as they are known from conventional techniques.

The preferred embodiments of the invention are described in the following with exemplary reference to two-dimensional photosensor arrays (matrix arrays). It is emphasized that the implementation of the invention is not restricted to this configuration, but rather possible in a corresponding manner with one-dimensional photosensor arrays (line arrays). Line sensors comprising one single line of photosensors or multiple lines of photosensors for collecting different color intensities of the image can be considered here as matrix or line array.

1. Imaging with a Standard Camera

Figure 1:
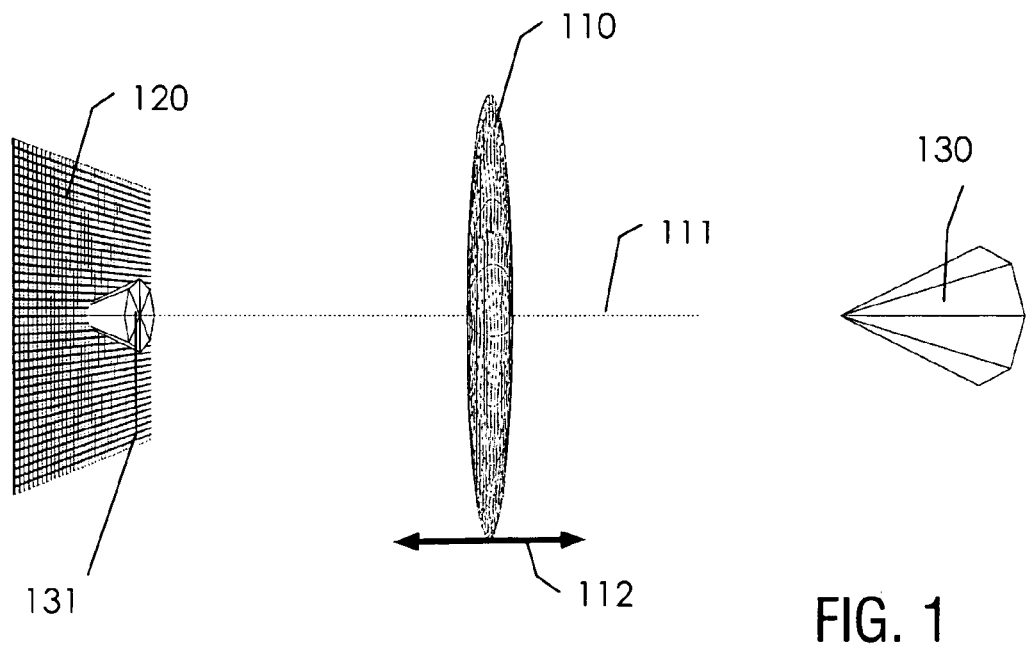
FIGS. 1 and 2: schematic illustrations of a conventional standard camera without a microlens array.

Before the concept of the MFPC is discussed, the image generation process of a standard camera is described. FIG. 1 shows the basic elements of a standard camera. The main lens 110 focuses the light emanating from or reflecting of an object 130 on its right onto a surface on its left, which can be regarded as the virtual image 131. Since the object 130 varies along the optical axis 111 the virtual image 131 does not lie on a plane perpendicular to the optical axis. The resultant image is generated by spatially combining the light intensities measured by the photosensors on the plane 120 over a given period of time, whereby the photosensor plane 120 is oriented perpendicular to the optical axis. In the resultant image only those parts of the object 130 appear to be in focus whose virtual image 131 lie on or close to the photosensor plane 120. That is, the intersection of the virtual image 131 with the photosensor plane 120 is the image of optimal focus. In order to optimally focus a different part of the object 130 onto the photosensor plane 120, the main lens 110 has to be moved along the optical axis as indicated by the arrows 112.

Figure 2:
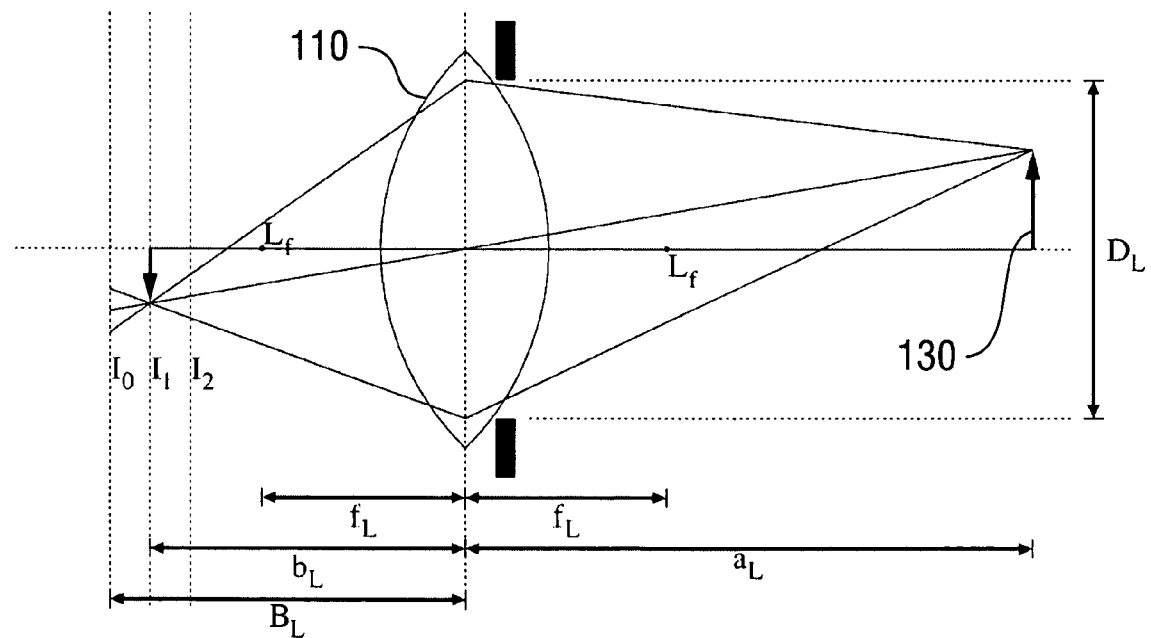

FIG. 2 shows the optical geometry of the above standard camera. Before discussing the camera setup with microlenses, it is helpful to look at this simplified standard camera setup of FIG. 2. The main lens 110 generates an image of a point on the object 130 to its right, by focussing the various rays that emanate from that point to a single point on its left. In reality, the rays are not exactly focused to a point, but have an intensity distribution which depends on the whole imaging system. This intensity distribution is usually called the point spread function (PSF). A fairly good approximation of the spacial extent of the PSF is given by $$s_\lambda := \lambda F, \quad (1)$$

where $\lambda$ is the wavelength of the light and F is a measure of the amount of light that can enter the imaging system. F is called the F-number and is defined as $$F := \frac{B_L}{D_L}. \quad (2)$$

The position $b_L$ along the optical axis to which an object at distance $a_L$ from the lens plane is projected, can be calculated by the thin lens equation $$\frac{1}{f_L} = \frac{1}{a_L} + \frac{1}{b_L}. \quad (3)$$

If, as shown in FIG. 2, the plane of best focus $l_1$ does not coincide with the image plane $l_0$, the object will be blurred, as soon as the diverging projection rays are separated by more than one pixel at the image plane. This means that the standard camera only optimally focuses a single plane in object space onto its image plane. One method to increase the range in object space that generates a focussed image, is to decrease the size of the aperture, since then the projection rays diverge more slowly away from the optimal focal plane. The limit is to reduce the aperture to a single point, in which case the whole object space is in focus, but also the amount of light entering the camera is infinitesimal. In standard photography an appropriate compromise between the depth of field and the camera speed, i.e. the size of the aperture, has to be found.

2. Imaging with an Inventive Multiple Focus Plenoptic Camera

Figure 3:
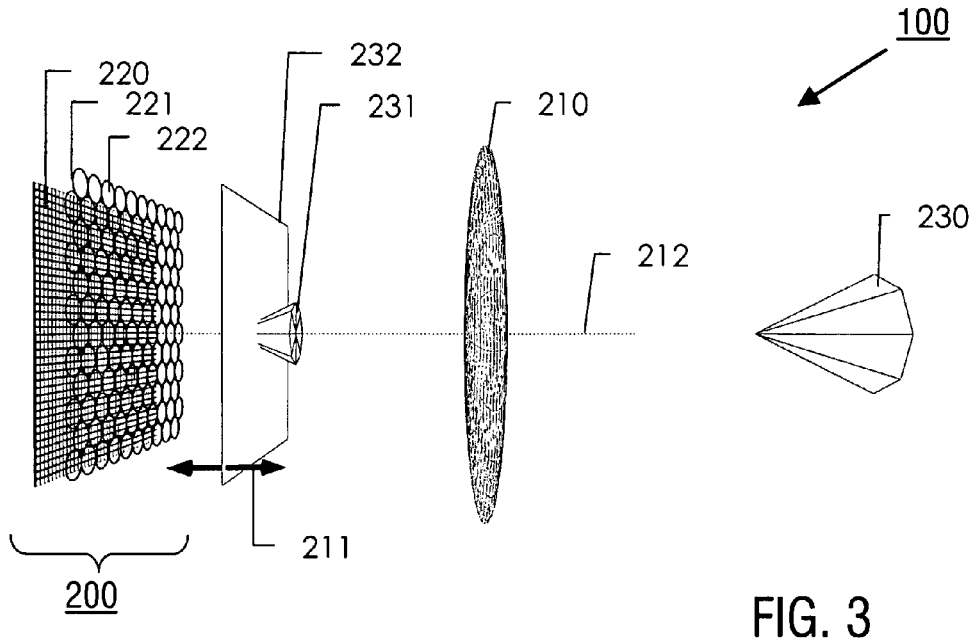
FIGS. 3 and 4: schematic illustrations of an inventive multiple focus plenoptic camera.

FIG. 3 shows the basic setup of a multiple focus plenoptic camera 100 including the inventive digital imaging device 200. A microlens array 221 consisting of a plurality of microlenses 222 is placed in front of the plane 220 of the photosensor array. The diameter of the microlenses is chosen larger than the diameter of a single photosensor such that each microlens can generate an image on a plurality of photosensors. The photosensor array is e.g. a CCD matrix or line array comprising e.g. 12,000,000 photosensors. The microlens array 221 comprises e.g. 47,604 microlenses each having a diameter of 153 µm and a focal length selected from e.g. three focal lengths of 526 µm, 567 µm and 616 µm. All microlenses have the same diameter, e.g. 153 µm. The distance between the microlens array 221 and the photosensor array is e.g. 765 µm. The image generated by a microlens on the photosensor plane will be called micro image. Each micro image is made of e.g. 17 photosensors. The micro images of neighboring microlenses should not overlap. The microlens array being made of a transparent glass or plastic is fixedly attached to the photosensor array as it is known from conventional plenoptic cameras, e.g. with a mechanical frame the thickness of which setting the distance between the microlens and photosensor arrays.

The main lens 210 generates a virtual image 231 of the object 230. The microlenses in the microlens array 221 now act as small cameras recording different views of the virtual image. The various micro images can now be used to computationally simulate a virtual image plane 232 such that the resultant image is in focus for those parts of the virtual image that intersect with the virtual image plane. In order to focus different parts of the object 230 only the virtual image plane has to be moved along the optical axis as indicated by 211. Since this is done computationally, the image can be refocused after a raw image has been recorded. Furthermore, there is no restriction on the form of the virtual image plane 232, that is instead of a virtual image plane also an arbitrarily shaped virtual image surface can be simulated. This can, for example, be used to bring all parts of the object into focus in the resultant image.

Since the microlenses have a finite field of depth only a finite range of the virtual image space can be focused onto the photosensor plane. To extend the field of depth of the whole imaging system microlenses with different focal lengths are used. Each group of microlenses of a particular focal length focuses a different range of depths of the virtual image space onto the photosensor plane. In one implementation a six times larger field of depth can be achieved by using a microlens array with three different types of microlenses of different focal length, as compared to using a microlens array with homogeneous microlenses.

Even though the virtual image in FIG. 3 is drawn between the microlens array and the main lens, the virtual image could also lie on or to the left of the microlens array. Which part of the virtual image space is focused by the microlenses depends on their focal lengths and the position of the microlens array along the optical axis. This is a design decision which depends on the application at hand.

Figure 4:
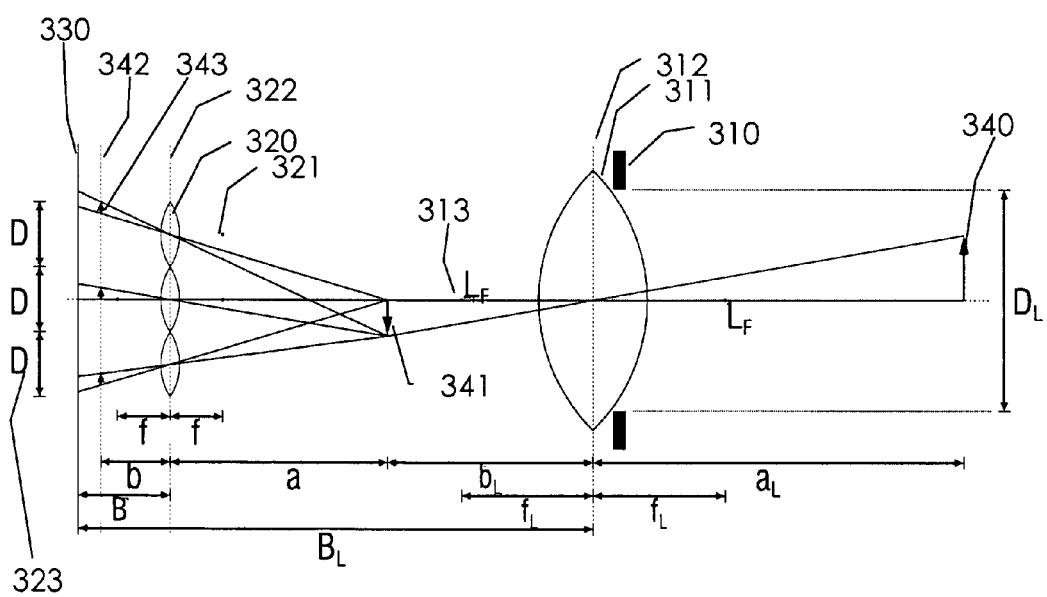

FIG. 4 schematically shows the optical geometry of the inventive plenoptic camera. The main lens 311 generates a virtual image 341 of the object 340. The virtual image lies somewhere to the left of the main lens 311. The image is virtual in the sense that it is not formed on the photosensor plane. The virtual image is then projected onto the photosensor plane 330 (image plane) by the microlenses in the microlens array 322. Note that the distance of the microlens array 322 from the photosensor plane 330 does not equal the microlenses' focal lengths. Furthermore, note that only the central projection rays are drawn that pass through the lenses' centers. In reality a plurality of light rays are influenced by the lenses. Note that there are typically many more microlenses than the three shown in FIG. 4, which have different focal lengths. This presentation has only been chosen for clarity. Below it is shown that while this setup reduces the effective resolution at each particular object distance, the effective resolution is spread out over a larger range, which allows for an extended field of depth at a larger aperture than would be possible with a standard camera.

The light emanating from object 340 is brought into focus at the virtual image 341. The microlenses may not optimally focus the virtual image onto the photosensor plane 330. Instead the optimal focus image plane 342 of the microlenses may lie at some distance from the photosensor plane. This depends on the focal lengths f of the microlenses and the distance a of the virtual image from the microlens array. By using microlenses with different focal lengths within the microlens array, virtual images at different distances a can be brought into focus on the photosensor plane simultaneously.

The inventive digital imaging system for synthesizing an image using data recorded with a plenoptic camera comprises therefore a photosensor line or matrix having a plurality of photosensors; an optics arrangement, including the main lens 311 and the microlenses set-up 322 arranged in at least a line of focus of the main lens 311, to direct light from an object 340 to the photosensor line or matrix via the main lens 311 and the microlenses line set-up 322 thereby generating micro images 343 for each micro lens; a control arrangement (not shown in FIG. 4) to set a relative distance between the photosensor line and the microlens set-up; wherein, for a set of light rays passing through a particular portion of the focal line of the main lens 311, a plurality of the photosensors are arranged in an image plane 330 to sense different ones of the set of light rays that concurrently arrive at the particular portion of the focal line at different angles of incidence, and to output light data characterizing the sensed light rays; and a processor in a computer set-up programmable to provide image data characterizing a synthesized image as a function of the light sensed at different photosensors, the position of the photosensors relative to the microlens set-up 322, and an angle of incidence of the sensed light upon the focal line of the main lens 311, wherein the focal lengths of each of the microlenses over the at least one-dimensional set-up differ from each other.

F-Number

An important constraint on the design of a MFPC is that the micro images should not over-lap on the photosensor plane. Those photosensors where the images of two or more microlenses overlap cannot be used for the computational construction of a resultant image. To ensure that the micro images have a maximal size while not overlapping it is a good approximation to make the F-numbers of the microlenses and the main lens equal.

In an array of densely packed microlenses this means that the image size of the microlenses must be smaller or equal to the diameter D of the microlenses. This means that, $$\frac{B}{D} = \frac{B_L - B}{D_L} \Leftarrow F = F_L - \frac{B}{D_L}, \quad (4)$$

where F is the F-number of the microlenses and $F_L$ the F-number of the main lens. Since typically $B \ll D_L$, it follows that $F \approx F_L$. That is, the F-numbers of the main imaging system and the microlens imaging system should match. Given B, $B_L$ and $D_L$, the maximal microlens diameter is given by $$D = \frac{BD_L}{B_L - B}. \quad (5)$$

Similarly, $$B = \frac{DB_L}{D_L - D}. \quad (6)$$

Figure 5:
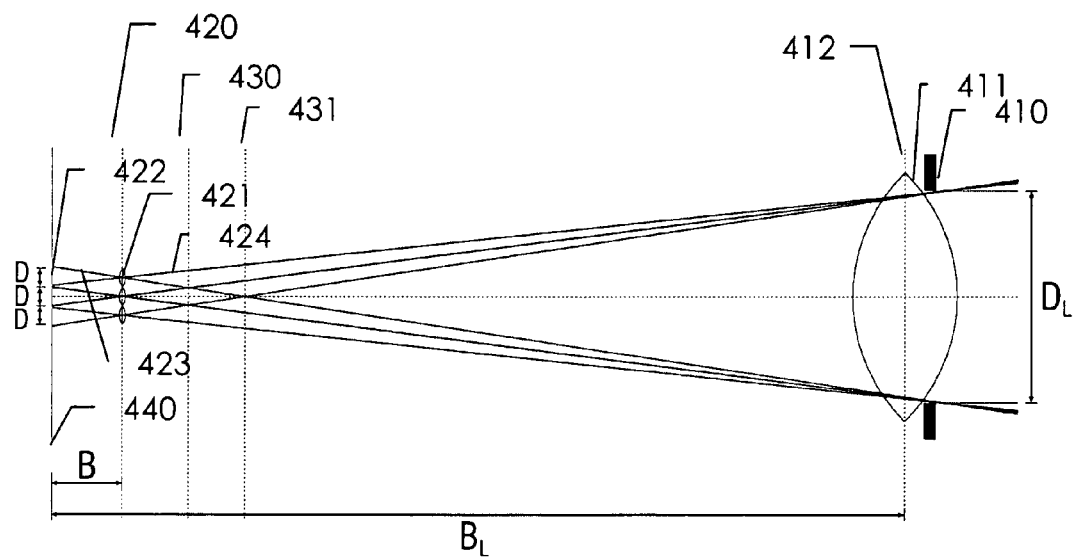

With respect to FIG. 5, the F-number of the main lens is given by $F_L = B_L/D_L$ and the F-number of the microlenses is given by $F = B/D$. Since typically $B_L \gg B$ and $D_L \gg D$ the micro images 422 will be maximal and not overlapping if $F = F_L$.

Multiplicity, Total Covering Plane

Figure 6:
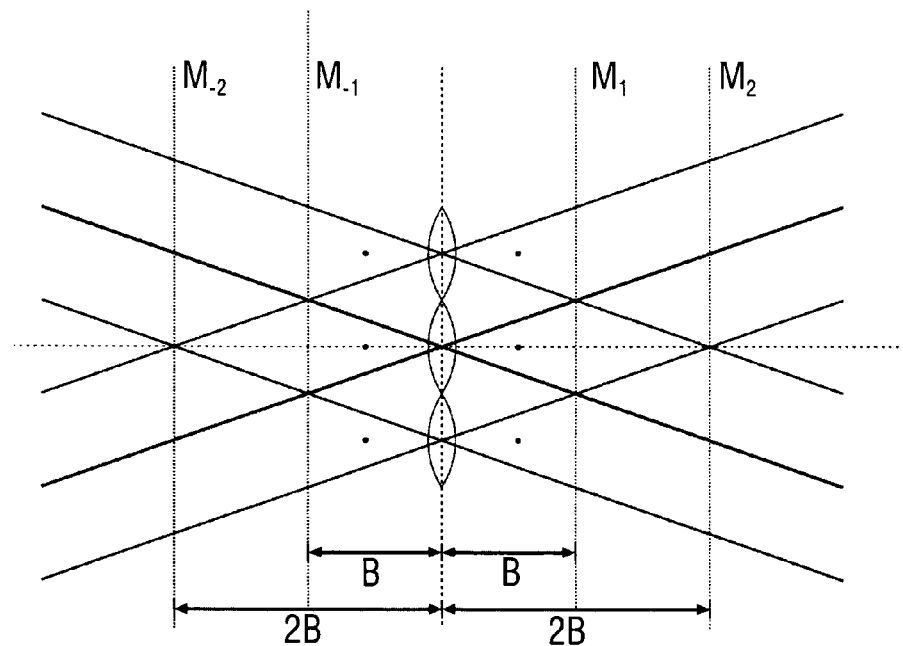

Another important concept is that of the total covering plane 430 as shown in FIGS. 5 and 6. The central projection rays drawn through the centers of the microlenses in FIG. 5 are the border rays of the corresponding micro images. For example, the microlens 421 does only project those points of a virtual image onto its micro image that lie between its extremal projection rays 423 and 424. Therefore, the total covering plane 430 is the left most plane to the right of the microlens plane 420 where each point on the plane is projected by at least one microlens. Similarly, the right most plane to the left of the microlens plane 420 is a total covering plane. In FIG. 5 the left total covering plane is identical with the photosensor plane. Similarly, a double covering plane 431 is the left most plane to the right of the microlens plane where each point on the plane is projected by at least two microlenses.

The concept of the total covering plane is further described with reference to FIG. 6. The number of lenses a test point is visible in, depends on the distance of the point from the microlens plane along the optical axis as shown in FIG. 6. The plane $M_1$ is the right total covering limit, which means that all points on or to the right of plane $M_1$ have an image in at least one microimage. The plane $M_{-1}$, which is also the image plane, is the left total covering limit, i.e. all point on or to the left of plane $M_{-1}$ have an image in at least one microimage. Plane $M_2$ ($M_{-2}$) is the double covering limit, which means that all points on or to the right (to the left) of plane $M_2$ ($M_{-2}$) have an image in at least two microimages.

It becomes clear from FIG. 6 that if the central lens is removed, the total covering limits are now $M_2$ and $M_{-2}$. It is important to note that removing the central lens has no effect on the ability to render an image for points outside the total covering limit planes. What is reduced is the amount of possible parallax, as will be shown later on.

For a 1D-array of microlenses the multiplicity M of a point at distance a from the microlens plane can be defined as $M := |a|/B$. For a 2D-microlens array an additional factor is introduced in the formula for M, which accounts for the gaps that appear in the tesselation of a plane with circles. The only two regular tessellations that exist in 2D are the orthogonal pattern shown in FIG. 7 and the hexagonal pattern shown in FIG. 8. In both figures R denotes the largest distance a point on the plane can have from its nearest surrounding microlens centers. For the orthogonal case it can be shown that $$R_o = \frac{D}{\sqrt{2}}. \quad (7)$$

For the hexagonal case it can be shown that $$R_h = \frac{D}{2}\sqrt{1 + \tan^2(\pi/6)}. \quad (8)$$

For the 1D-case the point of maximal separation from the nearest microlens centers, has distance D/2 from the microlens centers. The ratio of R to this value is called the spacing factor and is denoted by $\kappa$. That is, $$\kappa := \frac{2R}{D}. \quad (9)$$

Hence, $$\kappa_o = \sqrt{2} \approx 1.41, \kappa_h = \sqrt{1 + \tan^2(\pi/6)} \approx 1.15. \quad (10)$$

The multiplicity at a distance a from the microlens plane is therefore given by $$M = \frac{|a|}{\kappa B}. \quad (11)$$

Since $|a| = \kappa BM$, a smaller $\kappa$ is preferable. Hence, a hexagonal microlens array is preferable to an orthogonal microlens array.

If the microlenses are not densely packed in a 1D-array, but have a distance of C between their centers, the distance $\upsilon_1$ of the total covering limit plane $M_1$ from the microlens plane has the following relation:

$$\frac{B}{D/2} = \frac{B + \upsilon_1}{D/2 + C/2} \Leftarrow \upsilon_1 = B\frac{C}{D} = \gamma B, \quad (12)$$

where $\gamma := C/D$ is the ratio between spacing and size of the microlenses. For a 2D microlens array the distance of the covering plane of multiplicity M is given by $$\upsilon_M = \kappa \gamma BM. \quad (13)$$

The multiplicity at a distance a from the microlens plane is therefore given by $$M = \frac{|a|}{\kappa \gamma B}. \quad (14)$$

If the central lens in FIG. 6 is removed, the distance between neighbouring lenses is doubled, i.e. $\gamma = 2$. Hence, the multiplicity is in this case only half of the multiplicity for the densely packed lenses, at the same distance a.

Parallax

At a plane with multiplicity M only 1/M of each microimage is needed to render an image over the whole plane without gaps. For example, at M=2 only half of each microimage is needed to render a full image, which implies that two completely distinct full images can be rendered. The effect is a change in the apparent point of view. Due to this effect 3D-information about the scene can be recovered just as for a standard stereo camera system.

The amount of parallax on the image plane between the two extreme views is given by $$\Delta = D\left(1 - \max\left[\frac{1}{M}, \frac{1}{N}\right]\right), \quad (15)$$

where N=D/p is the number of pixels of size p in a microimage of size D. The parallax angle $\Delta_a$ is therefore given by $$\Delta_a = 2\tan^{-1}\left(\frac{\Delta}{2B}\right), \quad (16)$$

where B denotes again the distance of the microlens array to the image plane. Furthermore, the relative parallax $\Delta_r$ is defined as $$\Delta_r := \frac{\Delta}{D} = 1 - \max\left[\frac{1}{M}, \frac{1}{N}\right]. \quad (17)$$

With respect to FIG. 6, it follows that if the central lens is removed the multiplicity at some position a is reduced, which reduces the parallax.

$\Delta$ can be written as a function of a by substituting equation (14) into equation (15), which results in $$\Delta = D\left(1 - \max\left[\frac{\kappa\gamma B}{|a|}, \frac{1}{N}\right]\right). \quad (18)$$

Similarly, the relative parallax is $$\Delta_r = 1 - \max\left[\frac{\kappa\gamma B}{|a|}, \frac{1}{N}\right]. \quad (19)$$

Note that the equations for $\Delta$, $\Delta_r$ and $\Delta_a$ are only valid for $|a| \geq v_1$. The distance $l_{max}$ from the microlens plane, where the parallax is maximal, is given by $$l_{max} = \kappa\gamma BN = \kappa\gamma\frac{BD}{p}. \quad (20)$$

Effective Resolution

The effective resolution of a multiple focus plenoptic camera refers to the maximal resolution of an image that can be generated computationally from the raw image data generated by the MFPC from a purely geometrical point of view. The resolution of the resultant image may still be increased by appropriate image enhancement algorithms.

With respect to FIG. 4 the effective resolution of a MFPC depends on the distance a of the virtual image 341 from the microlens plane 322, the field of depth of the microlenses and the resolution of the photosensor plane 330. In general the effective resolution of a MFPC varies over the virtual image space.

The field of depth of a microlens is defined as follows. Consider first the projection of a virtual image point $X_0$ by a single microlens 510 in FIG. 9. In particular, FIG. 9 shows the blurring of point $X_0$ on the image plane I, when the optimally focused image $Y_0$ of $X_0$ does not lie on the image plane I. This observation can be translated into the concept of an effective resolution of the camera at a particular object separation a.

Only the light rays emanating from point $X_0$ that lie within rays 521 and 522 are bent by the microlens 510 such that all rays meet at point $Y_0$, i.e. $Y_0$ is the image of $X_0$. The distance b of the point $Y_0$ from the microlens plane 511 can be given in terms of the distance a of the point $X_0$ to the microlens plane 511 and the focal length f of the microlens, by the ideal lens equation $$1/f = 1/a + 1/b \quad (21)$$

If the distance B between the microlens plane 511 and the photosensor plane 530 differs from b then the light rays emanating from point $X_0$ do not meet in a point on the photosensor plane. Instead, the light rays spread out to a spot of diameter s as shown in FIG. 9. Assuming that the photosensor plane consists of a plurality of square photosensors of side length p, then the resolution ratio of the microlens is defined as $$\epsilon_L = \frac{p}{\max[|s|, p]} \quad (22)$$

For example, if s is twice as large as the pixel side length p then $\epsilon_L = \frac{1}{2}$. The relation between s, B, b and D is given by b/D=(B−b)/s. With the help of equation (21) it follows that $$s = D\left(B\left(\frac{1}{f} - \frac{1}{a}\right) - 1\right). \quad (23)$$

As shown in FIG. 9, the light spots of two neighboring virtual image points $X_0$ and $X_1$ can only be distinguished on the photosensor plane 530 if the distance of the light spot centers is s. Therefore, the virtual image point closest to $X_0$ that can still be distinguished from $X_0$ is the virtual image point $X_1$. The distance $s_a$ between $X_0$ and $X_1$ is therefore the minimal size of entities in virtual image space at a distance a from the microlens plane that can still be distinguished, when projected onto the photosensor plane 530 by the microlens 510.

The effective resolution ratio (ERR) of a plenoptic camera and a multiple focus plenoptic camera is defined as the ratio between the minimal size of a virtual image structure that can be resolved at a distance a from the microlens plane and the side length p of a square photosensor element on the photosensor plane. The ERR denoted by $\epsilon(a)$ is therefore given by $$\epsilon(a) = \frac{p}{|s_a|} = \frac{B}{|a|}\epsilon_L(a). \quad (24)$$

Let the total number of photosensor elements in one dimension on the photosensor plane be denoted by $N_t$, then the maximal number of pixels in a resultant image along that dimension is given by $$N_s(a) = N_t \epsilon(a). \quad (25)$$

Therefore, the resultant image of a virtual image plane perpendicular to the optical axis at a distance a from the microlens plane consists maximally of $N_e(a)^2$ pixel, i.e. $N_e(a)^2$ is the effective resolution of the plenoptic camera.

Using the method of similar triangles, the relation between s and a can be found from FIG. 9 as $$\frac{b}{D} = \frac{B-b}{s} \quad (26)$$

$$\Leftrightarrow s = D\frac{B-b}{b} = D\left(\frac{B}{b} - 1\right)$$

$$\Leftrightarrow s = D\left(B\left(\frac{1}{f} - \frac{1}{a}\right) - 1\right).$$

The ERR for a single lens $\epsilon_L$ can therefore be written as a function of the object distance a as $$\varepsilon_L(a) := \frac{p}{\max\left[\left|D\left(B\left(\frac{1}{f} - \frac{1}{a}\right) - 1\right)\right|, p\right]}. \quad (27)$$

This can also be written as $$\varepsilon_L(a) := \frac{p}{\max\left[\left|N\left(B\left(\frac{1}{f} - \frac{1}{a}\right) - 1\right)\right|, 1\right]}. \quad (28)$$

where $N=D/p$ is the number of pixels per microlens.

Note that equation (27) does not account for the effect of blurring due to diffraction, which depends on the light wavelength and the aperture as given in equation (1)

Figure 10:
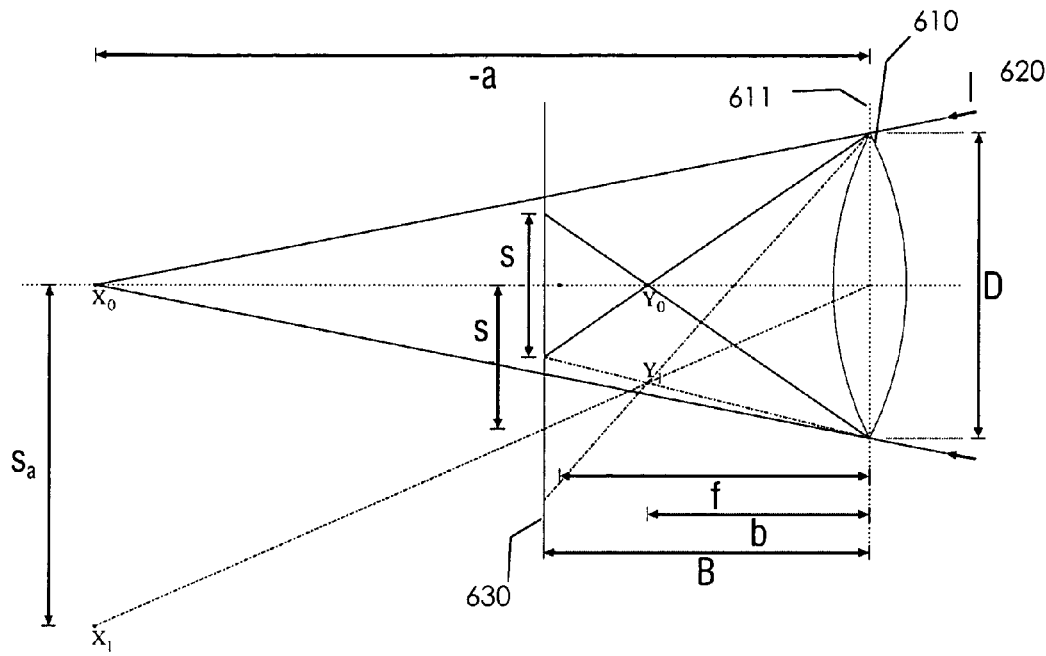

This derivation of the effective resolution of a plenoptic camera is also valid if the virtual image of the main lens lies to the left of the microlens plane with respect to FIG. 4. FIG. 10 shows this case for a single microlens 610. The light direction is indicated by 620. If the main lens (not shown in this Figure) creates a virtual image at $X_0$ then the microlens creates an optimally focused image of $X_0$ at $Y_0$. Equations (21) through (25) describe this case when a is replaced by −a.

It was mentioned earlier that one defining feature of the conventional plenoptic camera e.g. according to WO 2006/039486 A2 is that the distance B of the microlens plane from the photosensor plane equals the focal length f of the microlenses. For f=B the resolution ratio from equation (22) becomes $$\epsilon_L(a) = \min\left[\frac{p|a|}{DB}, 1\right]. \quad (29)$$

The effective resolution ratio is then given by $$\epsilon(a) = \min\left[\frac{p}{D}, \frac{B}{|a|}\right]. \quad (30)$$

That is, for $$|a| \leq B\frac{D}{p}$$

it follows that $\epsilon=p/D$. Now, $N:=D/p$ gives the number of photo-sensors per micro image in one dimension and $N_L:=N_t/N$ is the number of microlenses along that dimension. The maximal number of pixels in a resultant image along one dimension is thus $$N_e = N_t\epsilon = \frac{N_t}{N} = N_L \quad (31)$$

Therefore the maximal number of pixels in a resultant image of a conventional plenoptic camera equals the number of microlenses in the microlens array.

Figure 11:
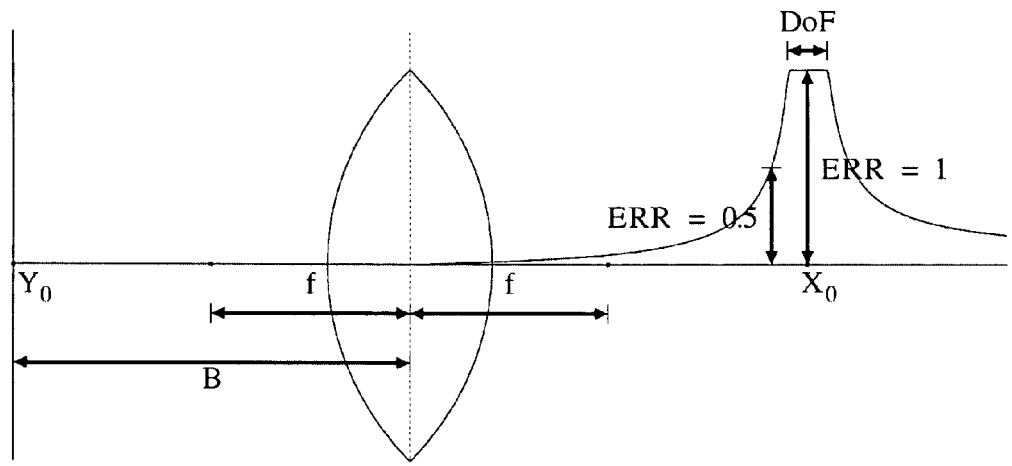
FIGS. 11 to 15: graphical representations of the effective resolution ratio of inventive and conventional cameras.

FIG. 11 shows an exemplary plot of the ERR, where B, D and f are fixed and the pixel size is assumed to be D/20. Point $X_0$ gives the position of optimal focus and DoF denotes the depth of field, where the blur is smaller than or equal to the size of a pixel.

Figure 12:
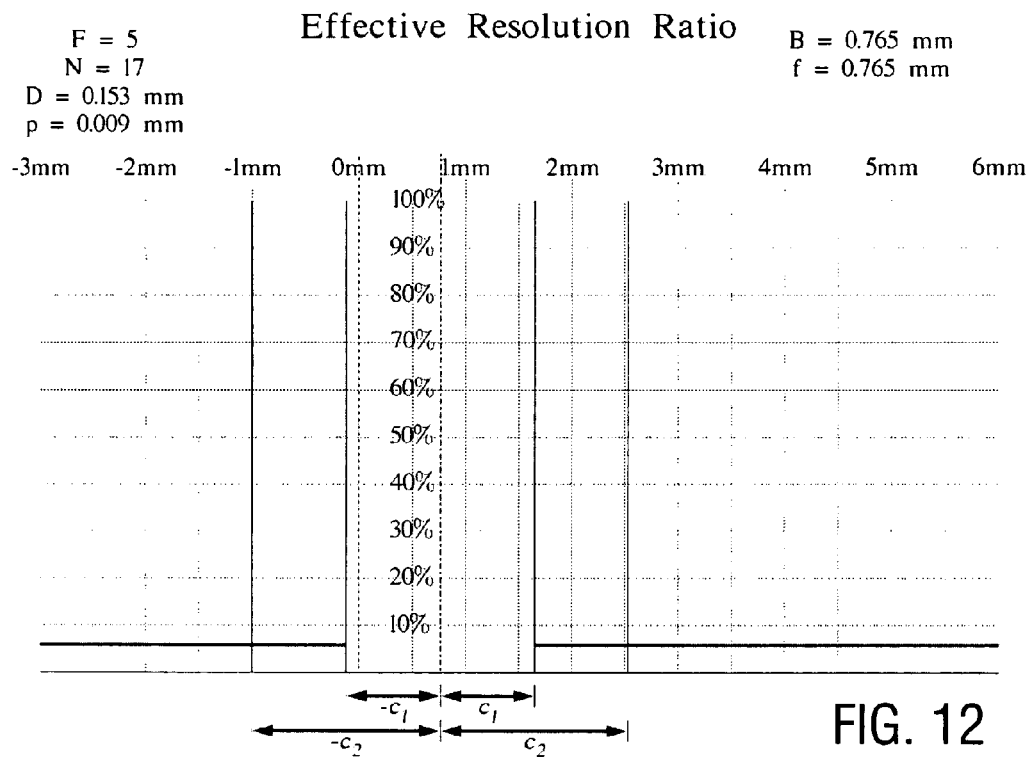
Figure 13:
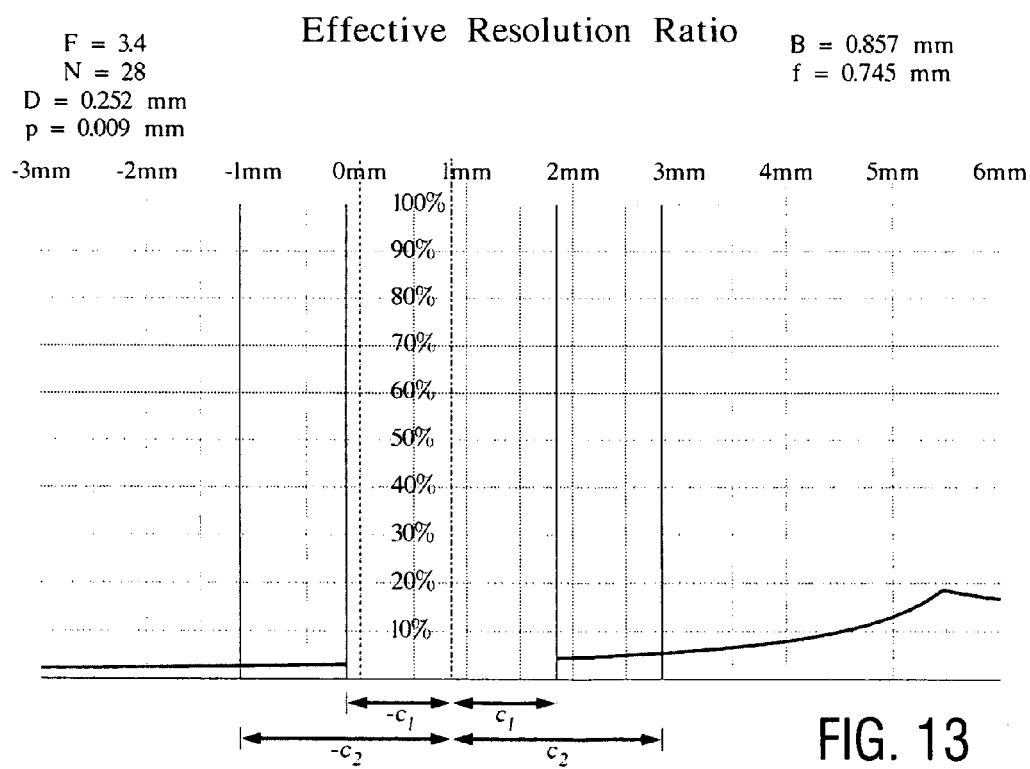

The above methodology is also valid for conventional plenoptic cameras as illustrated in FIGS. 12 and 13. The inventive methodology leads in particular to the finding that using varying focal lengths over the microlens array, the overall effective resolution of the plenoptic camera can be improved. In the conventional plenoptic camera design (e.g. WO 2007/092581 A2) the focal length of the microlenses is set equal to the distance of the microlens plane to the image plane, i.e. B=f. For the case B=f, equation (28) becomes $$\varepsilon_L(a) = \frac{1}{\max\left[\left|N\left(B\left(\frac{1}{B} - \frac{1}{a}\right) - 1\right)\right|, 1\right]} = \min\left[\frac{|a|}{NB}, 1\right]. \quad (32)$$

Hence, the effective resolution ratio for the plenoptic camera becomes $$\varepsilon(a) = \frac{B}{|a|}\varepsilon_L(a) = \min\left[\frac{1}{N}, \frac{B}{|a|}\right]. \quad (33)$$

That is, for all distances a from the microlens plane where $|a| \leq NB$, the ERR is constant and takes on the value 1/N. From equation (25) it follows that the effective resolution $N_g$ is in this case $$N_e = N_t\varepsilon(a) = \frac{N_t}{N} =: N_L, \quad (34)$$

where $N_L$ is the number of microlenses along one dimension of the microlens array. This is exactly what has been reported in the literature, i.e. the resolution of a standard plenoptic camera is just the number of lenses in the microlens array.

FIG. 12 shows the effective resolution ratio and the parallax of this setup. With the focused plenoptic camera of A. Lumsdaine and T. Georgiev (see e.g. US 2009/0041448 A1) the ERR shown in FIG. 13 is obtained.

Figure 14:
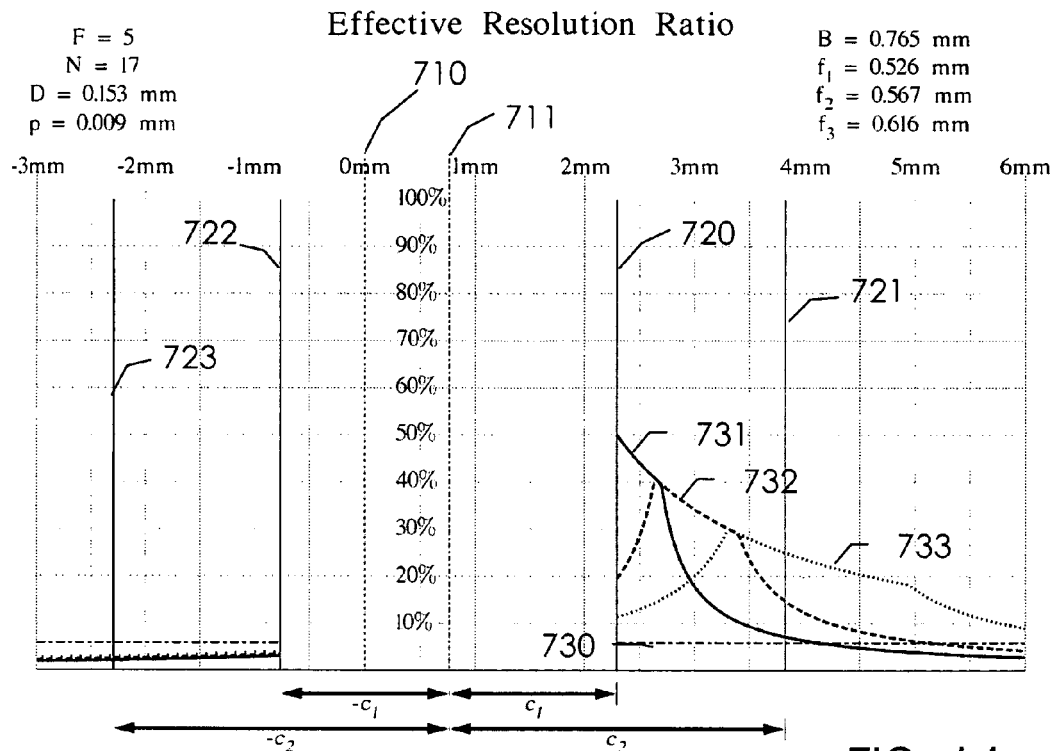

FIG. 14 shows a comparison between the ERR of a MFPC and a conventional plenoptic camera for one particular example implementation with f-number F=5, a photosensor side length of p=0.009 mm and a microlens diameter of D=0.153 mm, which results in N=17 photosensors per micro image and a separation of B=0.765 mm between the photosensor plane 710 and the microlens array plane 711. For the conventional plenoptic camera in this setup the focal length of all microlenses is set equal to B. The corresponding effective resolution ratio distribution with respect to a is shown in graph 730.

On the contrary, for the inventive multiple focus plenoptic camera three effective resolution ratio graphs are obtained, one for each focal length of a microlens type. The three focal lengths used in this example are f1=0.526 mm, f2=0.567 mm and f3=0.616 mm with corresponding graphs 731, 732 and 733, respectively. This shows that the MFPC offers a much higher resolution over a large depth range than the conventional plenoptic camera.

The effective resolution ratio graphs in FIG. 14 are only drawn outside the total covering limit planes, because between the left 722 and the right total covering plane 720 no complete resultant image can be constructed. The total covering planes drawn in FIG. 14 are those of the corresponding multiple focus plenoptic camera.

In general the focal lengths of the different types of microlenses can be adjusted to offer the optimal resolution distribution for a given application.

Figure 15:
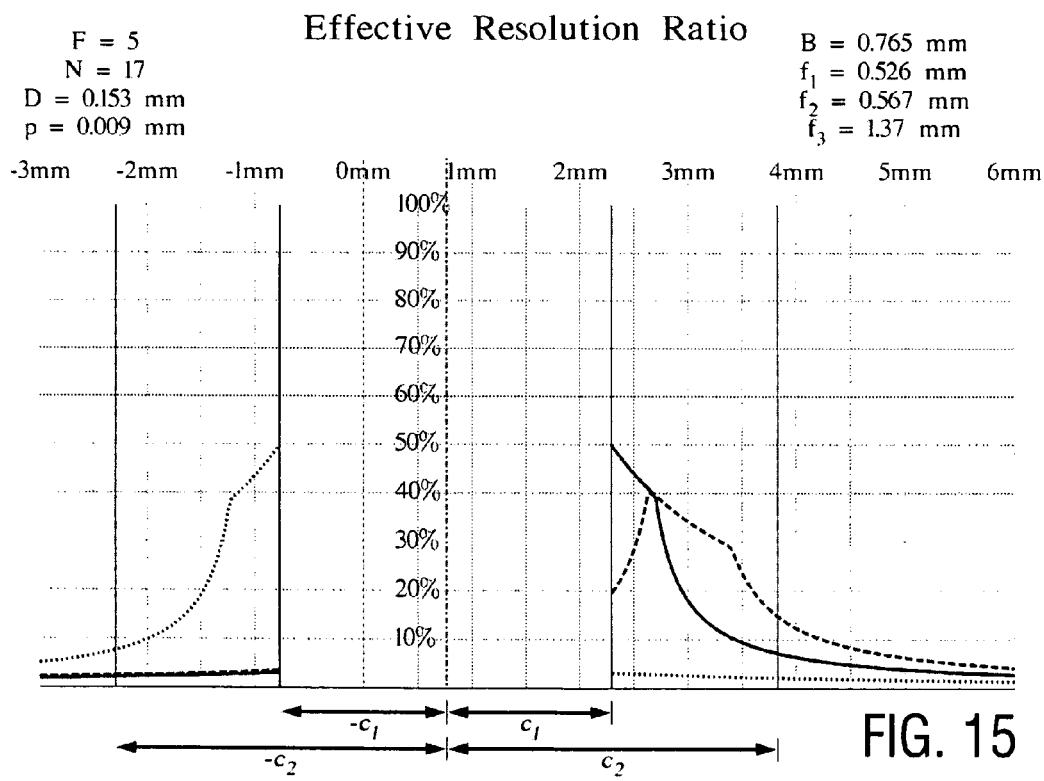

As a further example, FIG. 15 shows an effective resolution ratio distribution of a double depth multiple focus plenoptic camera with three different types of microlenses. I denotes the image plane and L the microlens plane. $\epsilon_1$, $\epsilon_2$ and $\epsilon_3$ are the effective resolution ratios of the three types of microlenses, respectively, and $\Delta_r$ is the relative parallax. FIG. 15 shows the effective resolution ratio and parallax of multiple focus plenoptic camera that has an extended high effective resolution area in front of and behind the image plane. This has the effect that elements on the plane at $\upsilon_1$ and on the plane at $-\upsilon_1$ can be reconstructed with a high effective resolution. This could, for example, be used if an object has two parallel planes at different depths that need to be brought into focus simultaneously.

Note that in principle an increased number of different focal lengths for different microlenses could be used. Also a nearly continuous distribution of focal lengths over the microlens array could improve the overall performance of the plenoptic camera.

Total Covering Limit

The right and left total covering planes give the limits from where on a complete resultant image can be generated computationally. With respect to the example shown in FIG. 14, a resultant image can be generated computationally for all positions in the virtual image space whose distance a from the microlens array plane satisfies $|a| \geq c_1$. Since the maximal effective resolution ratio $\epsilon(a)$ as given in equation (7) varies with $1/|a|$, the larger the distance between the microlens array plane and the total covering plane is, the lower the maximally achievable effective resolution. In the design of a MFPC it is therefore essential to minimize the distance $c_1$ between the microlens array plane and the total covering plane.

In the case of a one-dimensional microlens array (line array) with microlenses of equal focal length and closely packed (touching but not overlapping) micro images as indicated in FIG. 5, the value of $c_1$ equals the distance B between the microlens array plane 420 and the photosensor plane 440. The distance $c_2$ of the double covering plane is then $c_2=2c_1$.

The maximally achievable effective resolution of a resultant image can be given in terms of the total covering limit. The effective resolution is maximal if the focal length f of a microlens type is chosen such that $|s| \leq p$ at the total covering plane, i.e. for $|a|=c_1$. It then follows from equation (22) that $\epsilon_L=1$ and thus $\epsilon(c_1)=B/c_1$. Writing $c_1=\gamma B$, where $\gamma$ is the total covering factor, it follows that $\epsilon(c_1)=1/\gamma$. Hence, for a square photo-sensor array with a total number of $N_t^2$ photosensors, the maximally achievable effective resolution is $$N_e^2(c_1) = \frac{1}{\gamma^2} N_t^2 \qquad (35)$$

This shows that the smaller the total covering factor $\gamma$ the larger the maximally achievable effective resolution.

Figure 16:
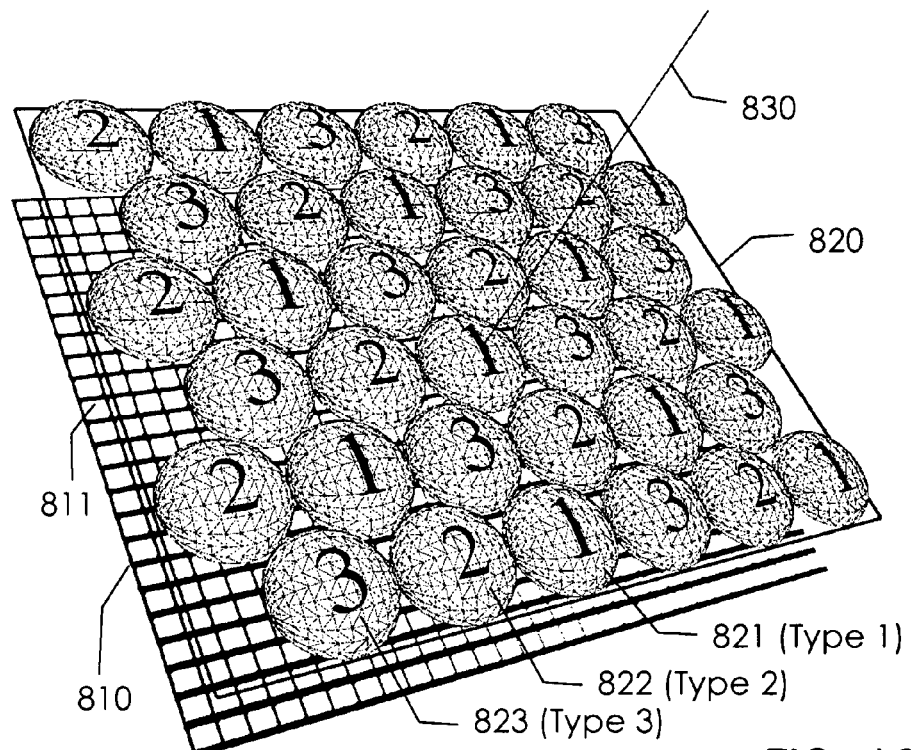
FIGS. 16 to 19: schematic perspective drawings illustrating further features of the inventive multiple focus plenoptic camera.

For a two-dimensional microlens array with circular microlenses the gaps between the microlenses have to be accounted for when calculating the value of $c_1$. FIG. 16 shows the configuration of circular microlenses in the microlens array of a MFPC with three different focal lengths that minimizes the value of $c_1$. The microlenses of types one 821, two 822 and three 823 are ordered in a hexagonal grid such that no two microlenses of the same type are direct neighbors.

Figure 17:
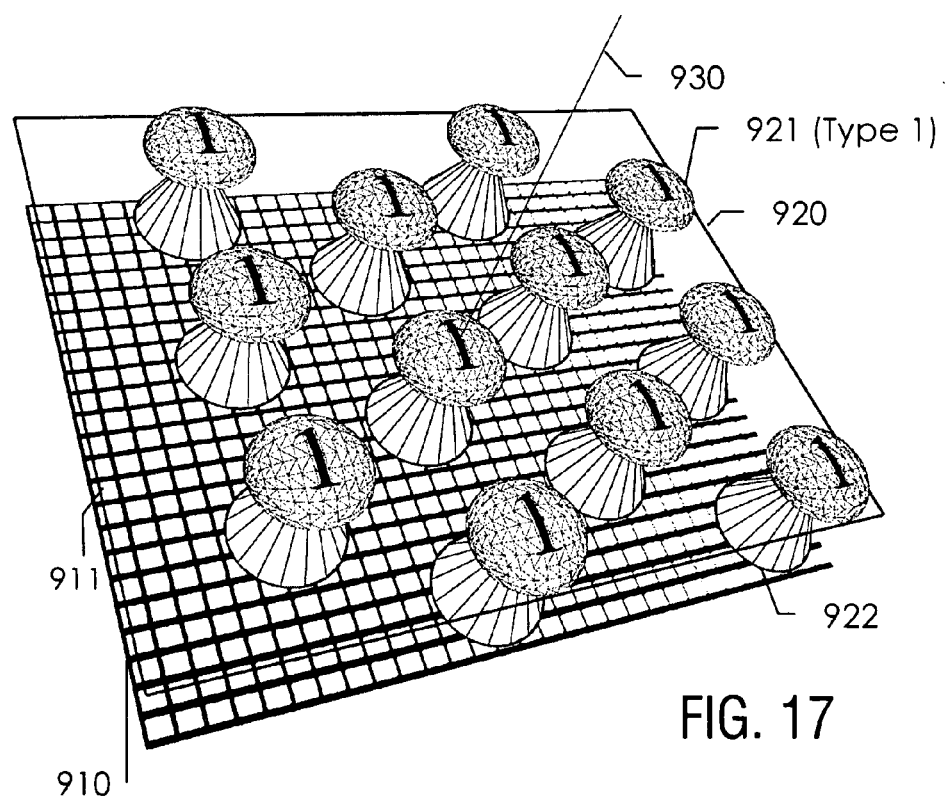

As shown in FIG. 14 each type of microlens covers a particular depth in the virtual image space. Therefore, each sub-array of microlenses of the same type allows for the generation of a resultant image independently of the other microlens types. FIG. 17 shows the sub-array of microlenses of type 1 of the total microlens array as shown in FIG. 16. Each microlens 921 has its corresponding micro image 922. This set of micro images is no long-er closely packed.

Figure 18:
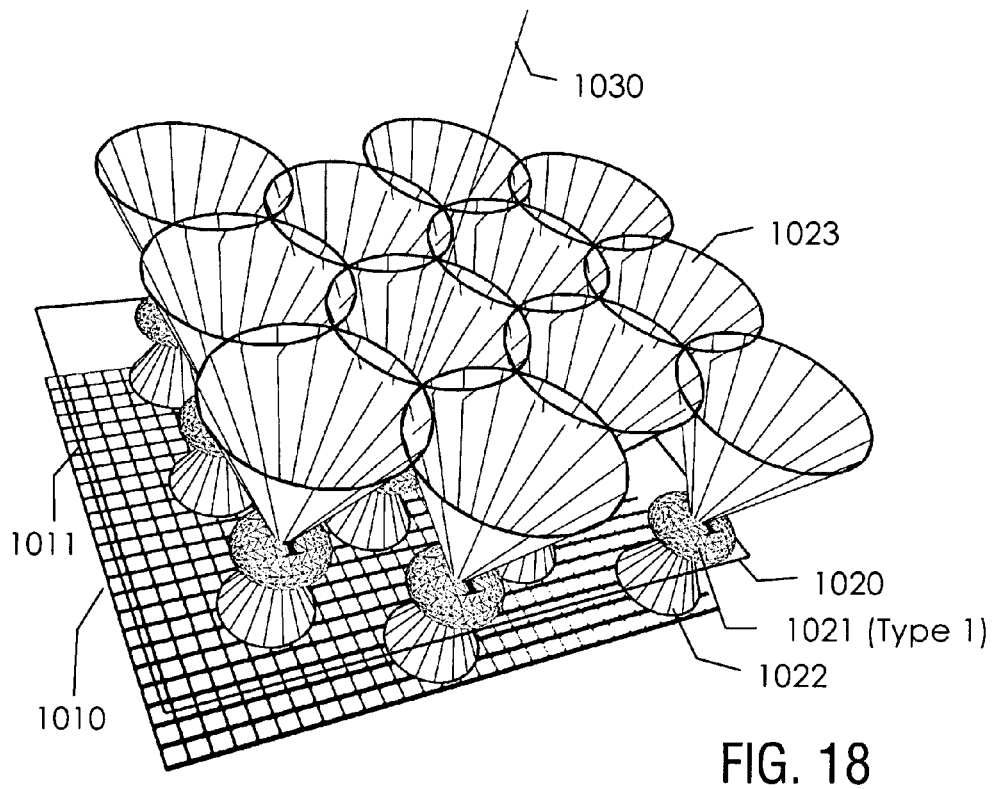

The subspace of the virtual image space that contributes to the micro image 1022 of the microlens 1021 in FIG. 18 lies within the micro projection cone 1023. The total covering plane is the plane perpendicular to the optical axis 1030 and closest to the microlens array plane 1020 such that the micro projection cones cover the whole total covering plane without gaps. The micro projection cones 1023 as drawn in FIG. 18 extend just to the total covering plane. If B denotes again the distance between the photosensor plane 1010 and the microlens array 1020 then the distance $c_1$ between the microlens array and the total covering plane is $c_1=2B$ for this microlens configuration, i.e. $\gamma=2$. This is the minimal value of $c_1$ for a microlens array with three different types of microlenses.

Figure 19:
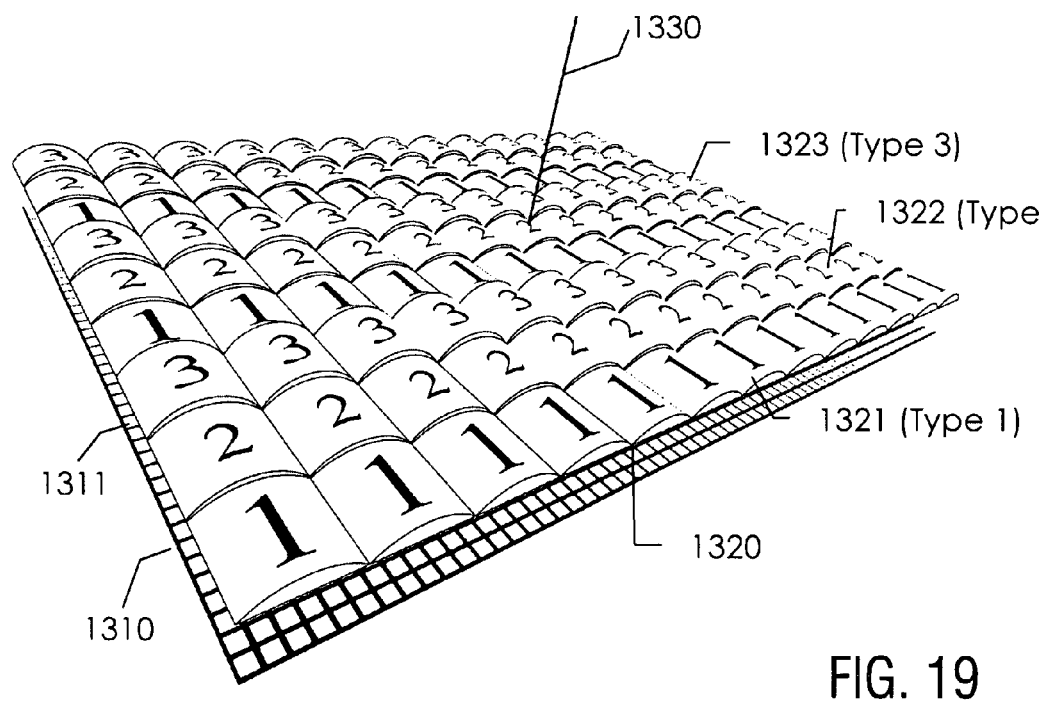

FIG. 19 shows another microlens configuration consisting of lines of cylindrical microlenses with different focal lengths. Along the lines of microlenses of the same type the total covering factor is $\gamma=1$, while perpendicular to the microlens lines the total covering factor is $\gamma=3$.

In general, as long as the micro images of the various microlenses in the microlens array of a MFPC do not overlap, they may be of any form and shape. For example, they may be plano-convex, bi-convex, plano-concave, bi-concave, concave-convex or a combination thereof. Furthermore, the shape of the microlenses in the microlens plane may be circular, elliptical, square or some arbitrary irregular shape. The surface shape of the microlenses may be spherical or aspherical. At the place of each microlens also a microlens system may be placed to improve the optical properties of the imaging system. The distance between the separate elements in such a microlens system may also be kept variable, for example, to allow for variable f-numbers of the main lens while keeping the micro images densely packed.

Microlens Array Configurations

It was noted before that removing every second microlens from the array will only push out the total covering plane and reduce the parallax at a particular distance from the microlens plane. However, it does not reduce the effective resolution at particular position. This is the fundamentally new concept introduced in this text, which enables the design of plenoptic cameras with improved properties, like an extended depth of field.

Figure 20:
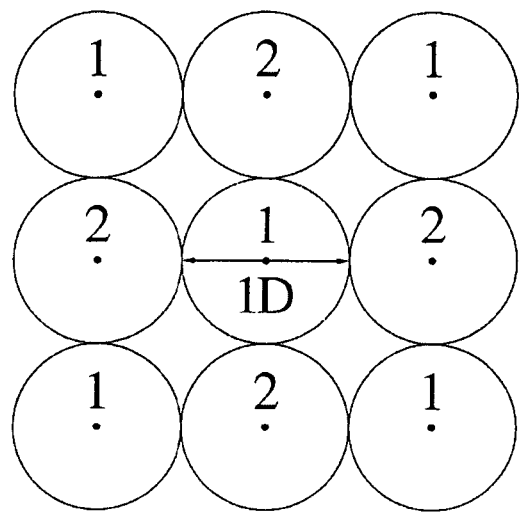
FIGS. 20 to 27: schematic illustrations of microlens arrangements.
Figure 21:
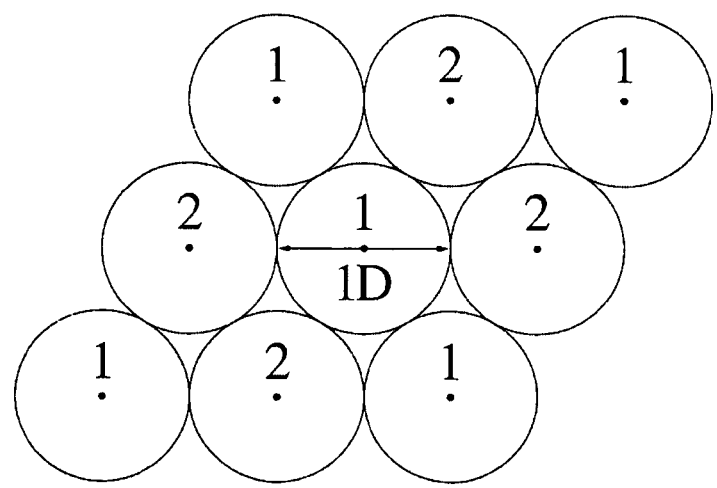
Figure 22:
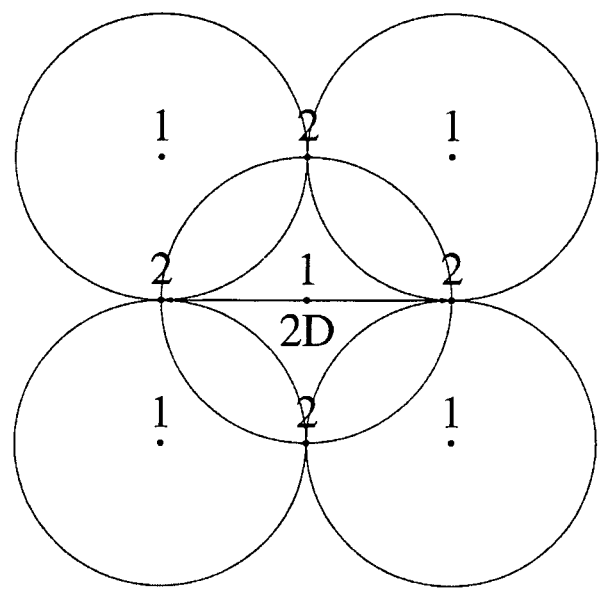
Figure 23:
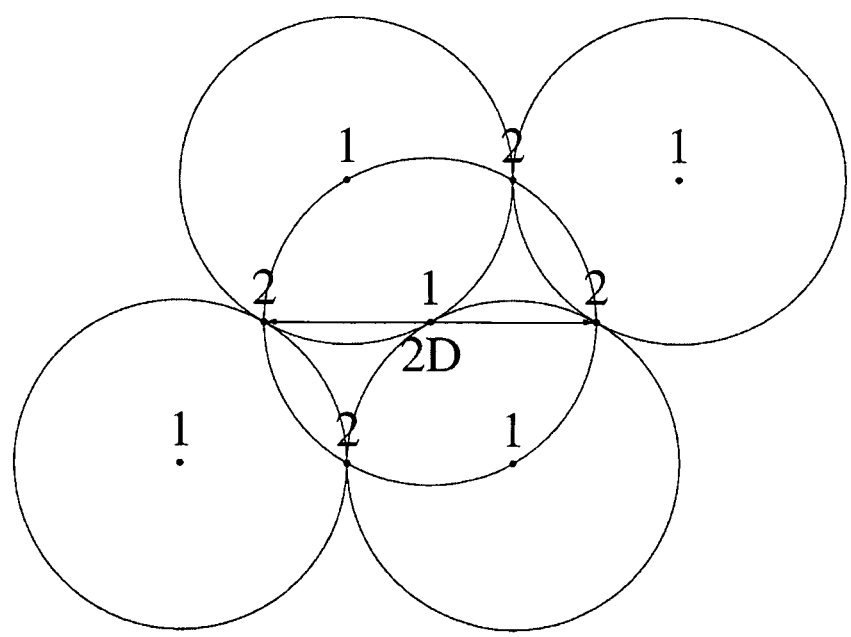

FIG. 20 and FIG. 21 show the distribution of microlenses of types 1 and 2 in an orthogonal and hexagonal microlens array, respectively. The microlenses of types 1 and 2 only differ in their focal lengths, while all other parameters are kept constant. The product of the spacing factor κ and the spacing ratio γ for a multiple focus plenoptic camera with two different types of lenses, is the same for the orthogonal and the hexagonal case. In both cases κγ=2, as can be seen in FIG. 22 and FIG. 23.

Figure 24:
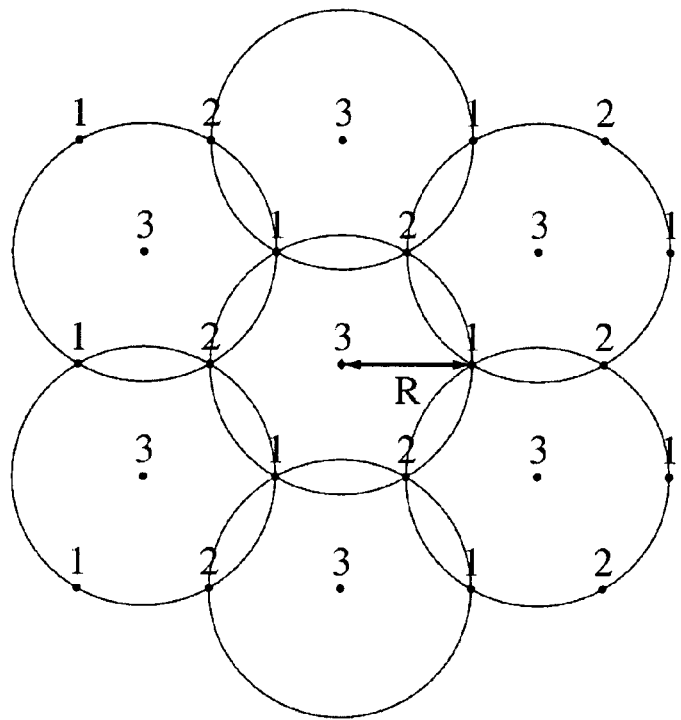
Figure 25:
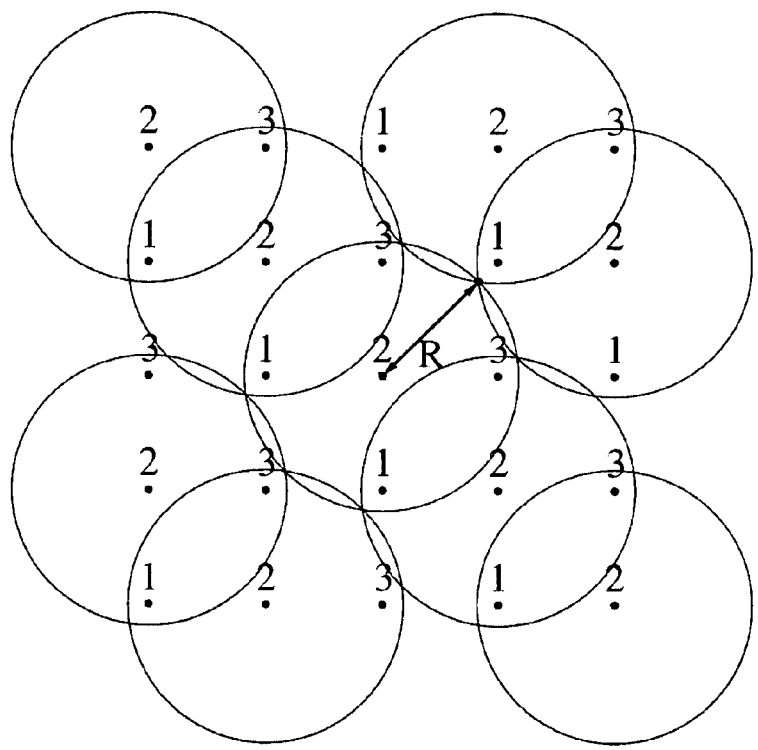

If three different types of microlenses are to be used the mixing of the lens types in a hexagonal and an orthogonal array are shown in FIG. 24 (see also FIG. 26, 1110) and FIG. 25 (see also FIG. 27, 1210), respectively. The product of the spacing factor κ and the spacing ratio γ for a multiple focus plenoptic camera with three different types of lenses, is different for the orthogonal and the hexagonal case. In the orthogonal case $$\kappa\gamma = 2\sqrt{2}\frac{5}{6} \approx 2.36,$$

while in the hexagonal case

κγ=2.

This is shown in FIGS. 24 and 25, respectively. Hence, in a hexagonal microlens array the total covering plane has the same distance from the microlens plane, independent of whether two or three different types of microlenses are used. It is thus advantages to use three different types of microlenses.

Figure 26:
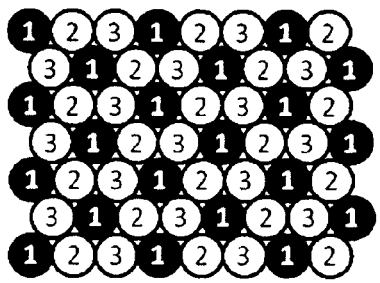
Figure 26:
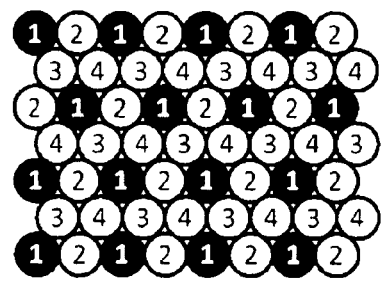
Figure 26:
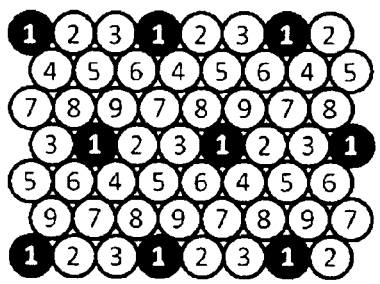
Figure 26:
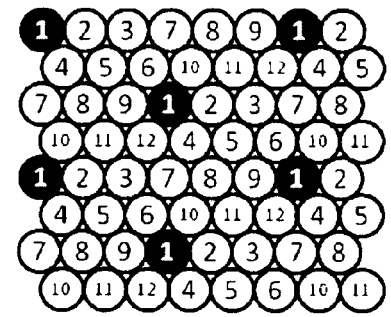

In general, a MFPC can be designed with any number of different types of microlenses. FIG. 26 shows some examples of microlens configurations which have a minimal value of $c_1$ for their respective number of microlens types. Each subarray of a particular microlens type in these configurations is regular and has the same value of γ.

Configuration 1110: 3 types of microlenses with γ=2.
Configuration 1120: 4 types of microlenses with γ=1+1/cos(π/6)≈2.15.
Configuration 1130: 9 types of microlenses with γ=1+3/[2 cos(π/6)]≈2.73.
Configuration 1140: 12 types of microlenses with γ=3.

Preferably, the regular grid configurations for different types of microlenses are those where each sub-array of microlenses of the same type forms a regular hexagonal grid. Large numbers of microlenses of different types in the microlens array may be useful if each type of microlenses can only cover a small depth range in the virtual image space, which is, for example, the case for comparably small photosensors.

Figure 27:
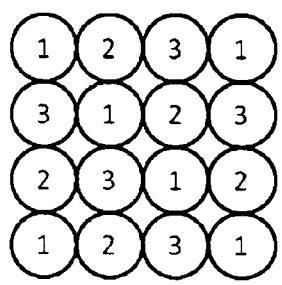
Figure 27:
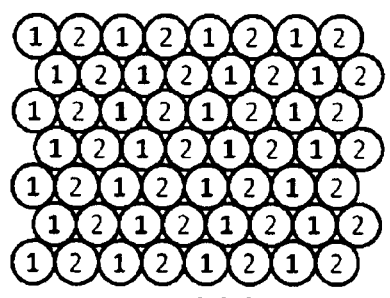
Figure 27:
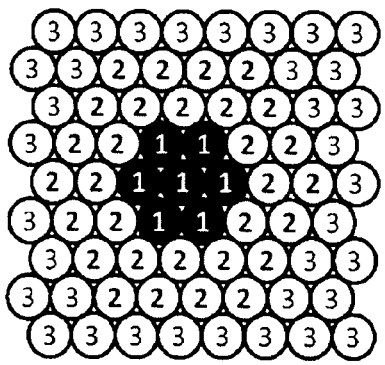
Figure 27:
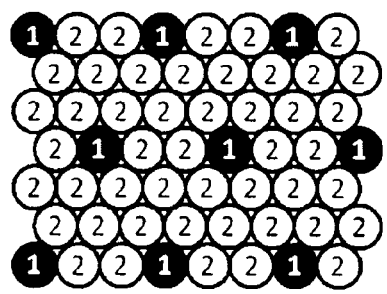

Depending on the application it may also be desirable to have an irregular distribution of microlenses of the same type. FIG. 27 gives some examples of irregular configurations of microlenses of different types.

Configuration 1210: 3 types of microlenses in an orthogonal grid.
Configuration 1220: 2 types of microlenses in a hexagonal grid.
Configuration 1230: 3 types of microlenses in a hexagonal grid.
Configuration 1240: 2 types of microlenses in a hexagonal grid.

With configuration 1230, the microlenses of type 1 are concentrated in the center and the microlenses of types 2 from a ring around the center. The microlenses of type 3 form again a ring around the microlenses of type 2. In this way each group of microlenses of the same type allows for the generation of a resultant image with a high spatial resolution for a particular part of the virtual image space.

With configuration 1240, the density of the microlenses of type 1 is lower than the density of the microlenses of type 2. In this particular case the total covering factor for the type 1 microlenses is γ=1+tan(π/3)≈2.73, and for the type 2 microlenses γ=2.

Multiple Microlens Array Plenoptic Camera

In addition to the multiple focus plenoptic camera, the functionality of a plenoptic camera can be extended further by using not just a single microlens array, but a number of microlens arrays along the optical axis. An example of such a construction with two microlens arrays is shown schematically in FIG. 28. In this example the two microlens arrays consist of biconvex microlenses, whereby the microlenses in the microlens array 1 have a smaller diameter than the microlenses in microlens array 2, and are surrounded by an opaque aperture. In general, any combination of lens types with an appropriate microaperture array is possible and can extend the functionality of the plenoptic camera.

Figure 28:
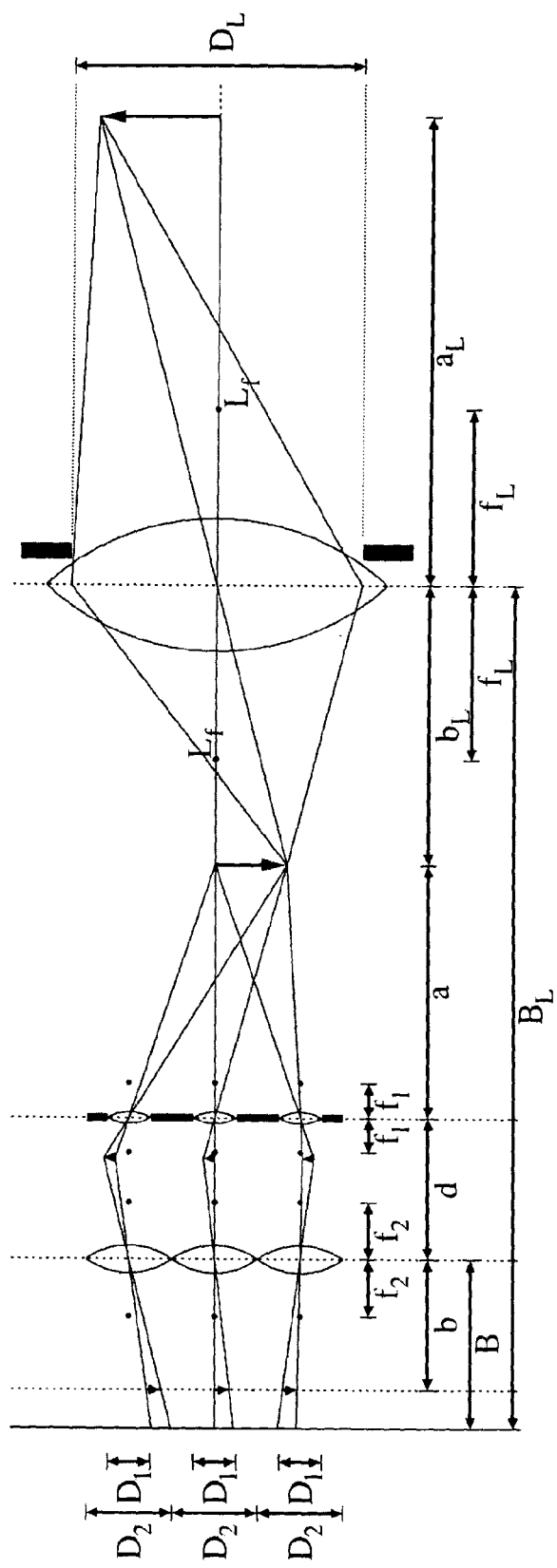
FIG. 28: a schematic example of a plenoptic camera using two microlens arrays along the optical axis.

In the construction shown in FIG. 28 the separation B between the microlens array 2 and the image plane, and the separation d between the two microlens arrays is kept variable by an appropriate mechanical construction. By varying B and d in an appropriate fashion, it can be ensured that microimages of constant diameter $D_2$ can be generated for varying F-numbers of the main lens system. In this way, the multiple microlens array plenoptic camera can achieve a constant effective resolution also when used with zoom lenses with varying F-numbers, or with different fixed focal length lenses that typically have different F-numbers.

For skilled persons, it is also straight forward to extend the basic example shown in FIG. 28 to combinations of more microlenses arrays with microlenses of different types, to achieve the same effect. One example for being of a different type is that each of the microlenses in a multiple microlens array plenoptic camera can consist of microlenses of different focal lengths.

3. Image Rendering

To render the intensity value (color value) that would have appeared at a position (x,y) on an image plane which is perpendicular to the optical axis, had the image plane been placed at a distance z from the microlens plane along the optical axis, the following procedure is applied:

1. Find the set of microlenses which do actually see the point at (x,y). These are all those microlenses whose centers fall inside a circle of radius r about the orthographic projection of (x,y) onto the microlens plane. The radius r is given by $$r = \frac{zD}{2B}.$$

2. For each of these microlenses, calculate the pixel position on the image plane onto which the point (x,y) is projected by the respective microlens.

3. The final intensity value is a weighted average of the intensity values on the image plane at the pixel positions calculated in the previous step. The weighting can be taken from calibration data that gives the amount of intensity attenuation at each of the pixel positions for the projection of point (x,y,z).

This method allows for the reconstruction of the image on an arbitrary surface and not just a plane. This is essential for applications where curved surfaces have to be brought into focus everywhere. The desired resultant resolution can easily be set by varying the step size of the render points, which also includes super sampling.

The inventive image rendering method for the multiple focus plenoptic camera is based on the one summarized above. In the selection of the microlenses used to evaluate the intensity value of a point, the distance of the point from the microlens plane is taken into account. For each distance there is one set of microlenses that can be used to optimally evaluate the color value. The inventive image rendering method for use with one- or two-dimensional arrays for the microlens set-up and the photosensor array for synthesizing an image from a set of light rays consequently comprises the following steps:

collecting a set of light rays in the main lens and the photosensor array to output light data characterizing the set of light rays;

directing by the microlens array, positioned between the main lens and the photosensor array the set of light rays from the main lens to the photosensor array;

setting the photosensor array in a positioning arrangement relative to the microlens array to facilitate selective detection of directional characteristics of light collected by the photosensor array; and computing with an image data processor a synthesized refocused image using the light data as a function of the arrangement and relative position of the main lens, microlens array and photosensor array, wherein the synthesized refocused image expresses a virtual redirection of the set of light rays as collected by the photosensor array, wherein the set of microlenses is selected which do actually see the point at (x,y) by finding which microlenses have centers that fall inside a circle of radius r about the orthographic projection of (x,y) onto the microlens plane where r is $$r = \frac{zD}{2B}.$$

for each of these microlenses the pixel position on the image plane is calculated onto which the point (x,y) is projected by the respective microlens, and the pixels are displayed as an image.

Further the digital imaging method for synthesizing an image from a set of light rays may do a weighting to find the final color value as a weighted average of the color values on the image plane at the pixel positions calculated in the previous step.

Any digital imaging method for synthesizing an image from a set of light rays as set might then take the weight from calibration data that gives the amount of intensity attenuation at each of the pixel positions for the projection of point (x,y,z).

Features of a Preferred Example

Figure 29:
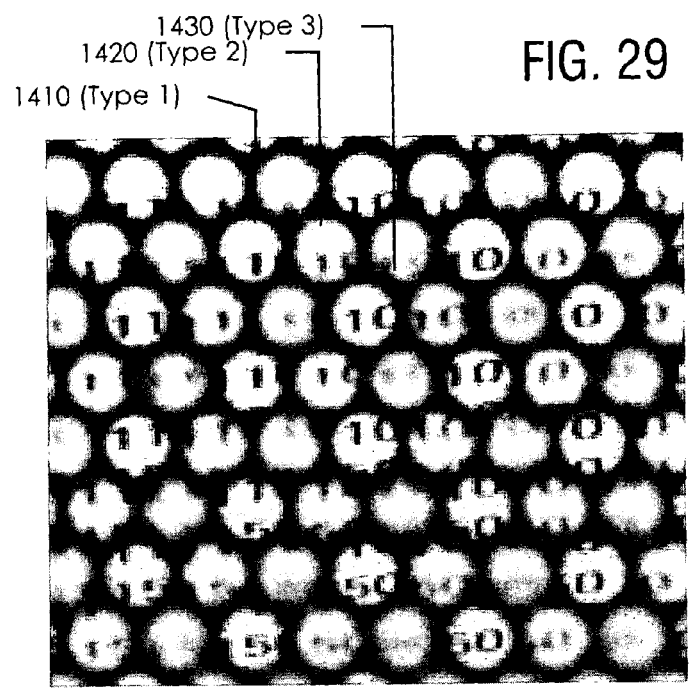
FIGS. 29 to 31: schematic illustrations of the inventive method for processing image data.

FIG. 29 shows an example of a raw image created on the photosensor plane of a MFPC when using a microlens array configuration as shown in 1110 in FIG. 26. The object that is imaged is only optimally in focus in one of the three types of microlenses. To generate a resultant digital image from this type of raw image the following image rendering algorithm is employed for processing the raw image data read from the photosensor array. De-tails of the image rendering process are described below with respect to FIG. 30 and the flow chart of FIG. 31.

S1. Select a virtual image surface (1530) whereby the z-component in the virtual image space coordinate system is parallel to the optical axis of the imaging system and defines the focal depth. The virtual image surface (1530) is a curved surface as shown or an arbitrarily shaped surface or a plane surface. The virtual image surface could be chosen such that it has the same shape as a particular type of known objects, whence the resultant image is in focus everywhere if the imaged object does not deviate from the known form. As an example, if the inventive plenoptic camera is used for imaging certain objects, e.g. in a manufacturing process for the purpose of monitoring cylindrical products, the chosen virtual image surface is matched to the surface of the object and e.g. a cylindrical virtual image surface is selected.

Divide the virtual image surface (1530) into a set of not necessarily regularly distributed virtual image points. The set of these virtual image points forms the resultant image.

S2. Select a first/further virtual image point.

For each of the virtual image points do the following:

S3. For the selected virtual image point (1531), select that microlens sub-array of microlenses of a particular type (group of microlenses having a common focal length) that have the largest effective resolution ratio at the z-value of the virtual image point.

Figure 30:
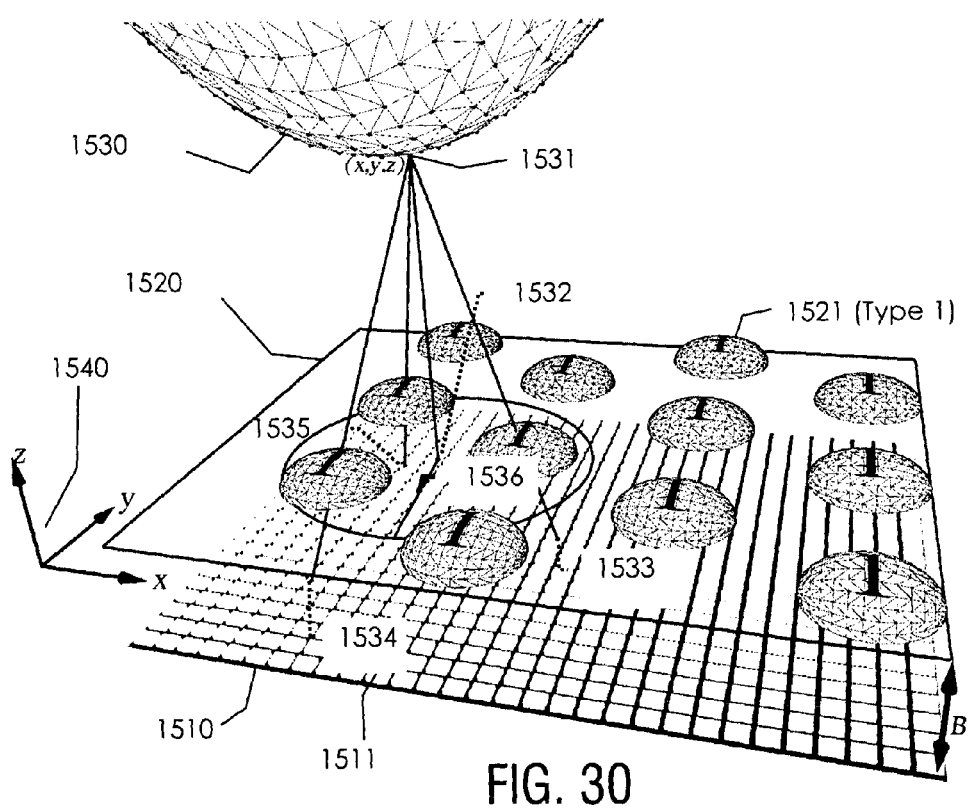
Figure 31:
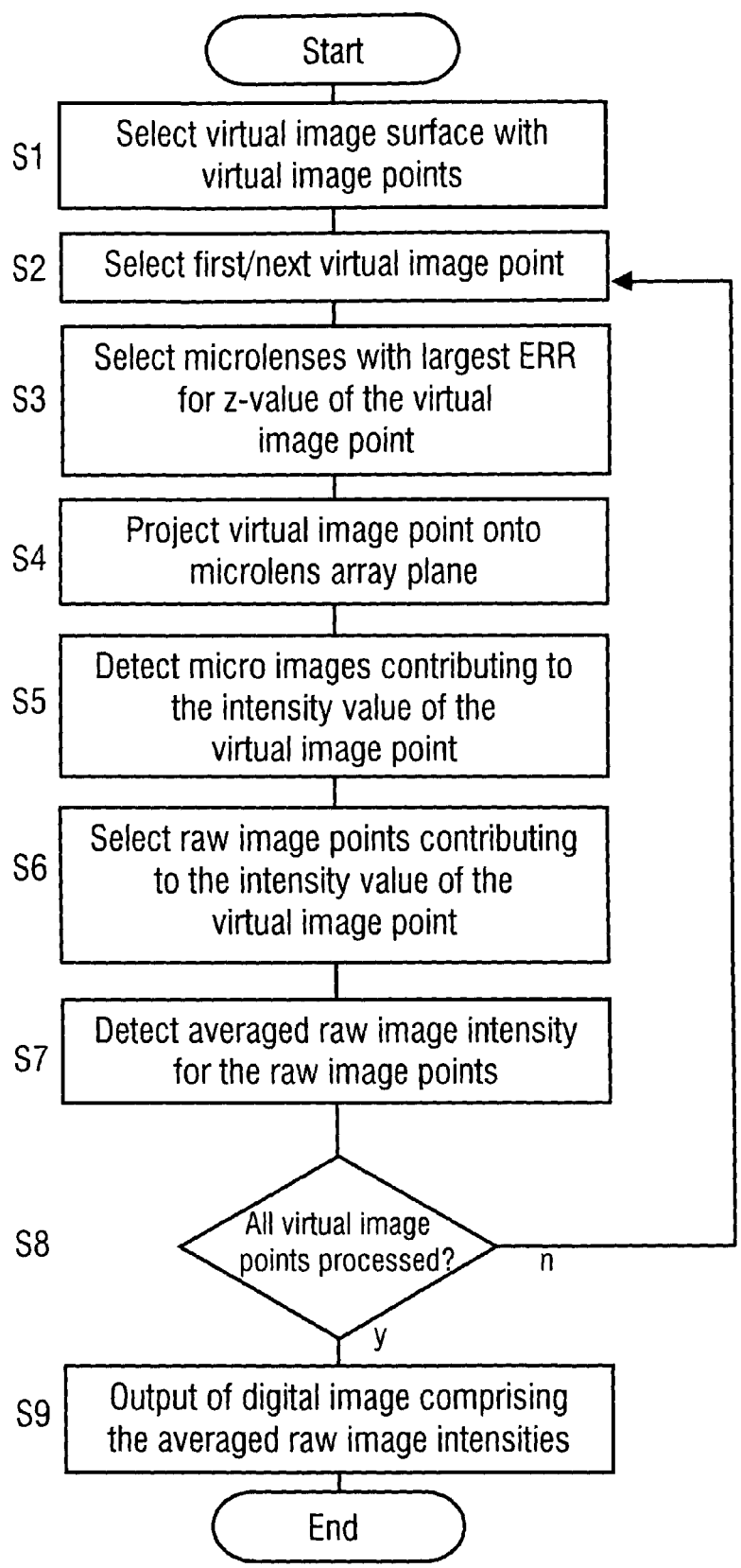

For example, the z-axis of FIG. 30 is the horizontal axis of FIG. 14. Therefore, in the example microlens configuration of FIG. 7, the best microlens type at z=3 mm is type 2.

S4. Project the virtual image point (1531) onto the microlens array plane (1520), which is assumed to lie at z=0.

S5. The micro images that can contribute to the intensity value of the virtual image point are those whose corresponding micro projection cones contain the virtual image point (1531). This is the case for the micro projection cones of all those microlenses whose centers lie within a circle of radius Rmax around the projected virtual image point (1532). The value of Rmax is given by Rmax=(zD)/(2B), where D is the microlens diameter and B is the distance between the photosensor plane (1510) and the microlens array plane (1520).

S6. For each microlens whose micro image can contribute to the intensity value of the virtual image point, find the intersection point of the line through the virtual image point and the microlens center with the photosensor plane. These intersection points will be called raw image points. In the example of FIG. 30 the raw image points are the points P1 (1533), P2 (1534) and P3 (1535).

S7. For each raw image point select as corresponding raw image intensity the intensity values (raw image data) of that photosensor whose center is closest to the raw image point. The final intensity value of the actual virtual image point is the mean value of the corresponding raw image intensities, i.e. the intensities of the raw image data are added and divided by the number of respective raw image points.

S8. Check whether all virtual image points have been processed. If not, continue with step S2. If yes, provide the digital image to be obtained using the averaged raw image intensities. Subsequently, the digital image can be output, e.g. displayed, printed, recorded or stored in a data storage.

To improve the image quality of the resultant image a number of modifications of this basic algorithm are possible using known image processing methods, well known to the professionals in this field. Some of these modifications are for example the following.

The raw image data can be improved with the following process:

Take a calibration image with the MFPC of a homogeneously white surface such that the intensities in the corresponding raw image are as high as possible without saturating the photosensors.

Take the image of the desired scene with the MFPC.

Divide the raw image data of the desired scene by the calibration raw image data. In this way variations in intensities due to the optical system and the photosensor sensitivities are removed in the raw image.

Aliasing effects in the resultant image can be reduced by replacing the step S7 of the image rendering algorithm by the following.

For each raw image point calculate the corresponding raw image, intensity from the set of photosensors surrounding the raw image point. This could be the mean intensity value of the photosensors in the set or an interpolated intensity value taking into account the distance of the photosensor centers from the raw image point. Many such interpolation algorithms are well known as state of the art.

The step S3 of the image rendering algorithm may be replaced by one of the following. Always use all microlens types for each selected virtual image point (1531).

Use all those micro lens types whose corresponding resolution ratio $\epsilon_L$ satisfies $\epsilon_L \leq 1$ for the given value of z, or if no such micro lens type exists, use the micro lens type with the smallest $\epsilon_L$.

4. Further Applications

The above described methods of the multiple focus plenoptic camera and the multiple microlens array plenoptic camera or combinations thereof can also be applied to one-dimensional light sensing devices, like line cameras, multi-line cameras, hand-held scanners, flat-bed scanners, or fotocopying machines.

In the case of a single line camera, a hand-held scanner, a flat-bed scanner or a fotocopying machine, one or a number of one-dimensional arrays of cylindrical lenses placed in the optical path of the light receptors would suffice, although other types of lenses are also possible. The advantage of such a construction over a standard device is that the surface that is scanned need not be flat and aligned with the scan plane. That is, non-planar surfaces can be brought into focus everywhere and also the 3D-form of the recorded surface can be recovered. The corresponding rendering and depth estimation algorithms are the same as before, with the simplification that only microlenses in one dimension contribute to a pixel.

A multi-line plenoptic camera has a number of parallel lines of light receptors with one or a number of microlens lines placed in the optical path. When moving an object underneath such a camera or when moving the camera over an object while recording images in particular time intervals, a data set equivalent to that of a two-dimensional plenoptic camera can be constructed. Again, the microlenses in the one-dimensional microlens line may have different focal lengths and/or a number of such microlens lines may be placed along the optical path. The advantage of such a construction is that an image with a very high resolution can be generated.

The features of the invention disclosed in the above description, the drawings and the claims can be of significance both individually as well as in combination for the realization of the invention in its various embodiments.

The invention claimed is:

1. A plenoptic camera, comprising:
   a main lens;
   and a digital imaging system including a photosensor array comprising: (a) a plurality of photosensors arranged in a predetermined image plane, and (b) a hexagonal microlens array comprising a plurality of microlenses arranged for directing light from an object to the photosensor array, wherein the photosensor array and the hexagonal microlens array are arranged with a predetermined distance,
   a diameter of each of the microlenses is larger than the diameter of the photosensors such that each microlens can generate an image on a plurality of photosensors,
   the microlenses have different focal lengths varying over the microlens array, wherein a focal length of each of the microlenses differs from the focal length of each of the nearest neighboring microlenses thereof in the hexagonal microlens array,
   each of the microlenses provides an effective resolution ratio depending on the focal length of the respective microlens and a depth distance from the microlens array, and
   the focal lengths of the microlenses are selected such that the effective resolution ratios have complementary maxima in adjacent ranges of depth distances, and
   the image plane of the photosensor array is arranged such that the distance between the photosensor array and the microlenses array does not equal the microlenses' focal lengths.

2. The plenoptic camera according to claim 1, wherein the hexagonal microlens array comprises groups of microlenses having a common focal length, wherein microlenses of different groups have different focal lengths.

3. The plenoptic camera according to claim 1, wherein the focal length of each of the microlenses is selected from two or three different focal lengths.

4. The plenoptic camera according to claim 1, wherein the focal length of each of the microlenses is selected from more than three different focal lengths.

5. The plenoptic camera according to claim 1, wherein the microlenses are arranged such that microlenses with equal focal length provide a regular grid.

6. The plenoptic camera according to claim 5, wherein the microlenses are arranged such that microlenses with equal focal length provide an orthogonal or hexagonal grid.

7. The plenoptic camera according to claim 1, wherein the distance between the photosensor array and the hexagonal microlens array is set by a control arrangement comprising a variable or fixed connection of the photosensor array and the hexagonal microlens array.

8. The plenoptic camera according to claim 1, wherein the hexagonal microlens array is a one- or two-dimensional array of microlenses.

9. The plenoptic camera according to claim 1, wherein all microlenses with a common focal length have the same diameter.

10. The plenoptic camera according to claim 1, wherein all microlenses of the microlens array have the same diameter.

11. The plenoptic camera according to claim 1, comprising:
   at least one supplementary microlens array comprising a plurality of microlenses arranged for directing light from an object to the hexagonal microlens array.

12. The plenoptic camera according to claim 1, further comprising:
   a processor in a computer set-up programmable to provide image data characterizing a synthesized image as a function of light sensed at different photosensors, the position of the photosensors relative to the hexagonal microlens array and an angle of incidence of the sensed light.

13. The plenoptic camera according to claim 1, wherein the hexagonal microlens array of the digital imaging system is arranged in a line of focus of the main lens optic to direct light from an object via main lens optic to the photosensor array, and for a set of light rays passing through a particular portion of the line of focus of the main lens optic, a plurality of the photosensors are arranged to sense different ones of the set of light rays that concurrently arrive at the particular portion of the line of focus at different angles of incidence.

14. Method for processing image data collected with a plenoptic camera according to claim 1, comprising the steps of:
   providing raw image data collected with the photosensor array,
   providing a predetermined virtual image surface including virtual image points,
   for each virtual image point, selecting a group of microlenses which depending on the focal length thereof have a maximum effective resolution ratio for imaging the virtual image point on the photosensor array, projecting the virtual image point on the hexagonal microlens array plane, detecting micro images of the selected group of microlenses contributing to the intensity value of the virtual image point,
   selecting raw image points the raw image data of which contributing to the intensity value of the virtual image point, and
   detecting an averaged raw image intensity of the raw image data at the raw image points, and
   generating a digital image comprising the averaged raw image intensities.

15. Method according to claim 14, wherein the virtual image surface is a virtual image plane or a surface adapted to a surface of an object to be imaged.

16. Method according to claim 14, wherein the step of generating the digital image is repeated for various virtual image surfaces.

* * * * *